US012633216B2

(12) United States Patent
Kamangar

(10) Patent No.: US 12,633,216 B2
(45) Date of Patent: May 19, 2026

(54) SYSTEMS AND METHODS FOR PARKING MANAGEMENT AND ENFORCEMENT

(71) Applicant: Nazar Kamangar, Walnut Creek, CA (US)

(72) Inventor: Nazar Kamangar, Walnut Creek, CA (US)

( * ) Notice: Subject to any disclaimer, the term of this patent is extended or adjusted under 35 U.S.C. 154(b) by 45 days.

(21) Appl. No.: 18/838,479

(22) PCT Filed: Feb. 17, 2023

(86) PCT No.: PCT/US2023/062867
§ 371 (c)(1),
(2) Date: Aug. 14, 2024

(87) PCT Pub. No.: WO2023/159213
PCT Pub. Date: Aug. 24, 2023

(65) Prior Publication Data
US 2025/0148913 A1    May 8, 2025

Related U.S. Application Data

(60) Provisional application No. 63/268,192, filed on Feb. 17, 2022.

(51) Int. Cl.
*G08G 1/14* (2006.01)
*G06Q 10/02* (2012.01)
*G07B 15/02* (2011.01)

(52) U.S. Cl.
CPC ............. *G08G 1/141* (2013.01); *G06Q 10/02* (2013.01); *G07B 15/02* (2013.01); *G06Q 2240/00* (2013.01)

(58) Field of Classification Search
None
See application file for complete search history.

(56) References Cited

U.S. PATENT DOCUMENTS

| | | | | |
|---|---|---|---|---|
| 9,666,075 | B2 * | 5/2017 | Davies ................... | G08G 1/146 |
| 10,861,334 | B2 * | 12/2020 | Torres ...................... | G08G 1/14 |
| 10,990,907 | B2 * | 4/2021 | Dermosessian ........ | G06Q 10/02 |
| 11,004,337 | B2 * | 5/2021 | Subramanya ......... | G01S 13/867 |
| 11,100,798 | B2 * | 8/2021 | Chinomi ............... | G08G 1/205 |
| 11,144,848 | B2 * | 10/2021 | Friedman ............... | G06Q 10/02 |
| 11,354,731 | B2 * | 6/2022 | Gomi ..................... | G08G 1/205 |
| 11,488,471 | B2 * | 11/2022 | Neff ........................ | G08G 1/017 |
| 11,526,798 | B2 * | 12/2022 | Pinel ...................... | G08G 1/14 |
| 2015/0138001 | A1 * | 5/2015 | Davies ................... | G08G 1/146 |
| | | | | 340/932.2 |
| 2016/0042643 | A1 * | 2/2016 | Hohenacker .......... | G08G 1/141 |
| | | | | 705/13 |
| 2017/0116790 | A1 * | 4/2017 | Kusens ................... | G08G 1/146 |
| 2020/0242924 | A1 * | 7/2020 | Publicover ............. | G08G 1/087 |

FOREIGN PATENT DOCUMENTS

AU          2020101119 A4 *   7/2020   ............. G08G 1/145

* cited by examiner

*Primary Examiner* — Fekadeselassie Girma
(74) *Attorney, Agent, or Firm* — Justin Lampel

(57)                ABSTRACT

A parking management and enforcement (PME) system for managing parking at a plurality of parking spaces. The PME system comprises a controller and a server. The controller is in signal communication with a sensor located proximate to a parking space of the plurality of parking spaces and the sensor is configured to determine the presence of a vehicle in the parking space. The server is in signal communication with the controller and the server.

2 Claims, 30 Drawing Sheets

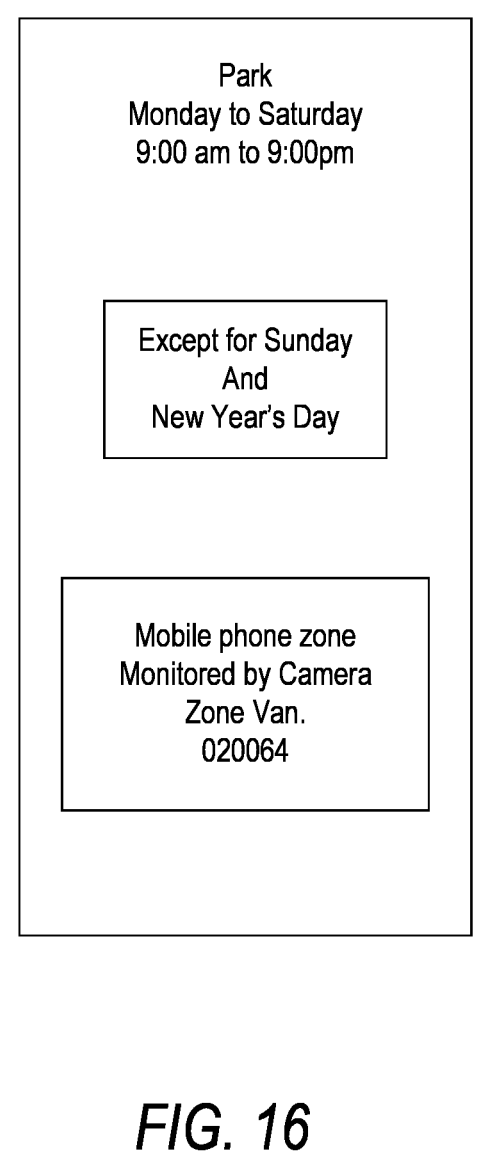

Park
Monday to Saturday
9:00 am to 9:00pm

Except for Sunday
And
New Year's Day

Mobile phone zone
Monitored by Camera
Zone Van.
020064

*FIG. 16*

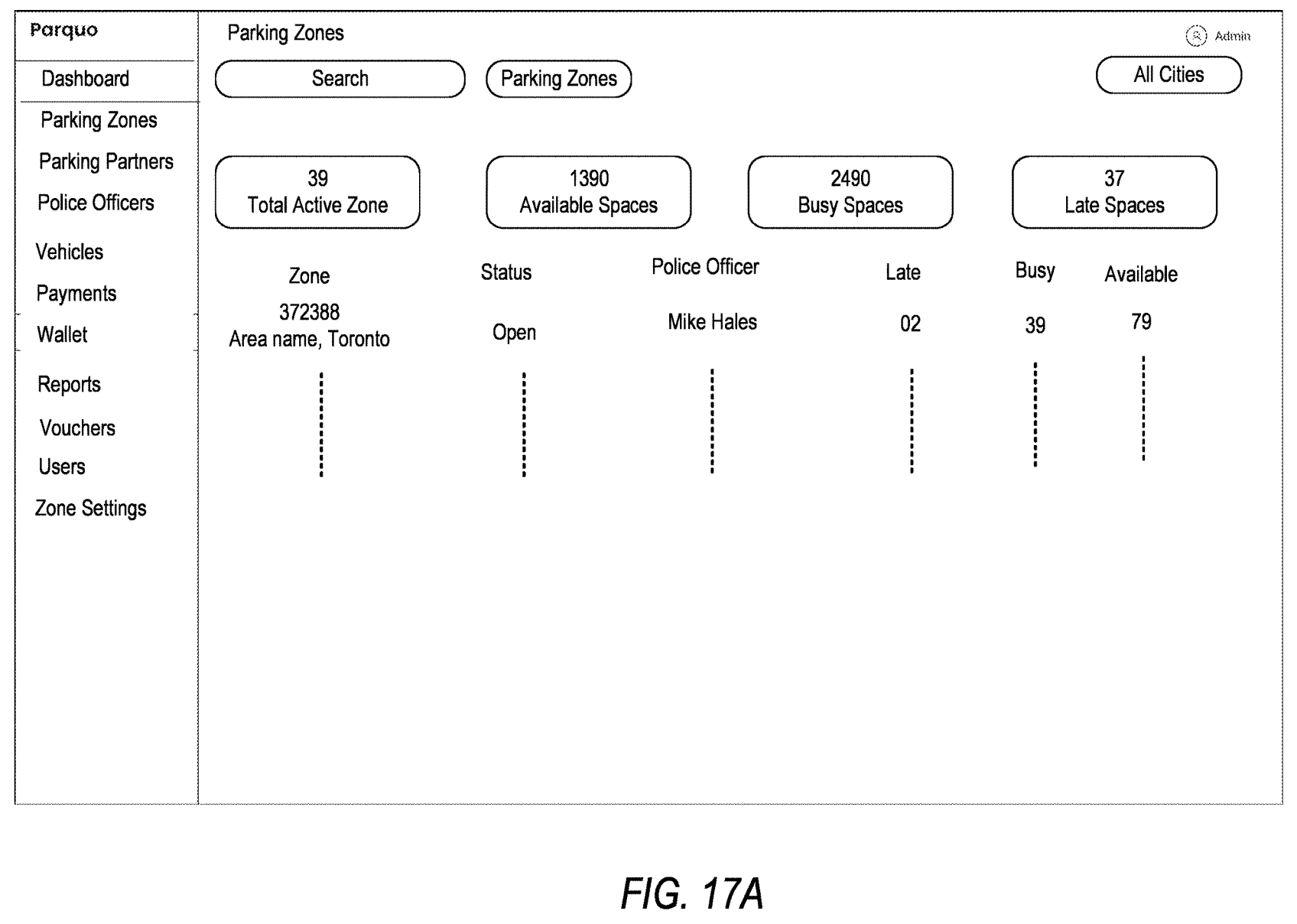

Parquo

Parking Zones ( Admin

Dashboard ( Search )          ( Parking Zones )          ( All Cities )

Parking Zones

Parking Partners

Police Officers

| 39 | 1390 | 2490 | 37 |
|---|---|---|---|
| Total Active Zone | Available Spaces | Busy Spaces | Late Spaces |

Vehicles

Payments

| Zone | Status | Police Officer | Late | Busy | Available |
|---|---|---|---|---|---|
| 372388 | Open | Mike Hales | 02 | 39 | 79 |
| Area name, Toronto | ------------- | ------------- | ------------- | ------------- | ------------- |

Wallet

Reports

Vouchers

Users

Zone Settings

FIG. 17A

Figure 17B:
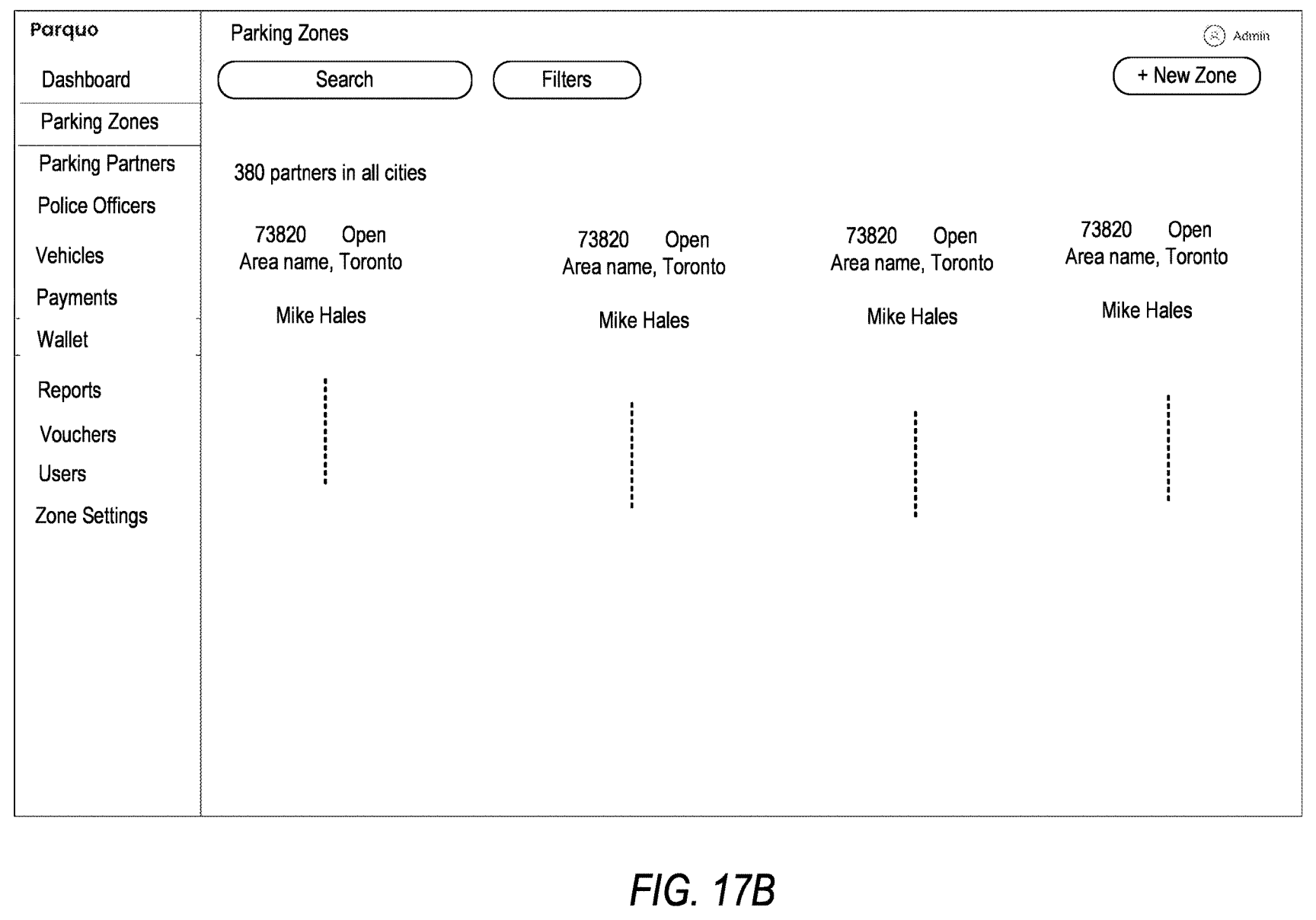

Parquo

Dashboard

Parking Zones

Parking Partners

Police Officers

Vehicles

Payments

Wallet

Reports

Vouchers

Users

Zone Settings

Parking Zones

Search    Filters

Admin    + New Zone 380 partners in all cities

73820    Open
Area name, Toronto

Mike Hales

- - - - - - - - - - - -

73820    Open
Area name, Toronto

Mike Hales

- - - - - - - - - - - -

73820    Open
Area name, Toronto

Mike Hales

- - - - - - - - - - - -

73820    Open
Area name, Toronto

Mike Hales

Figure 17C:
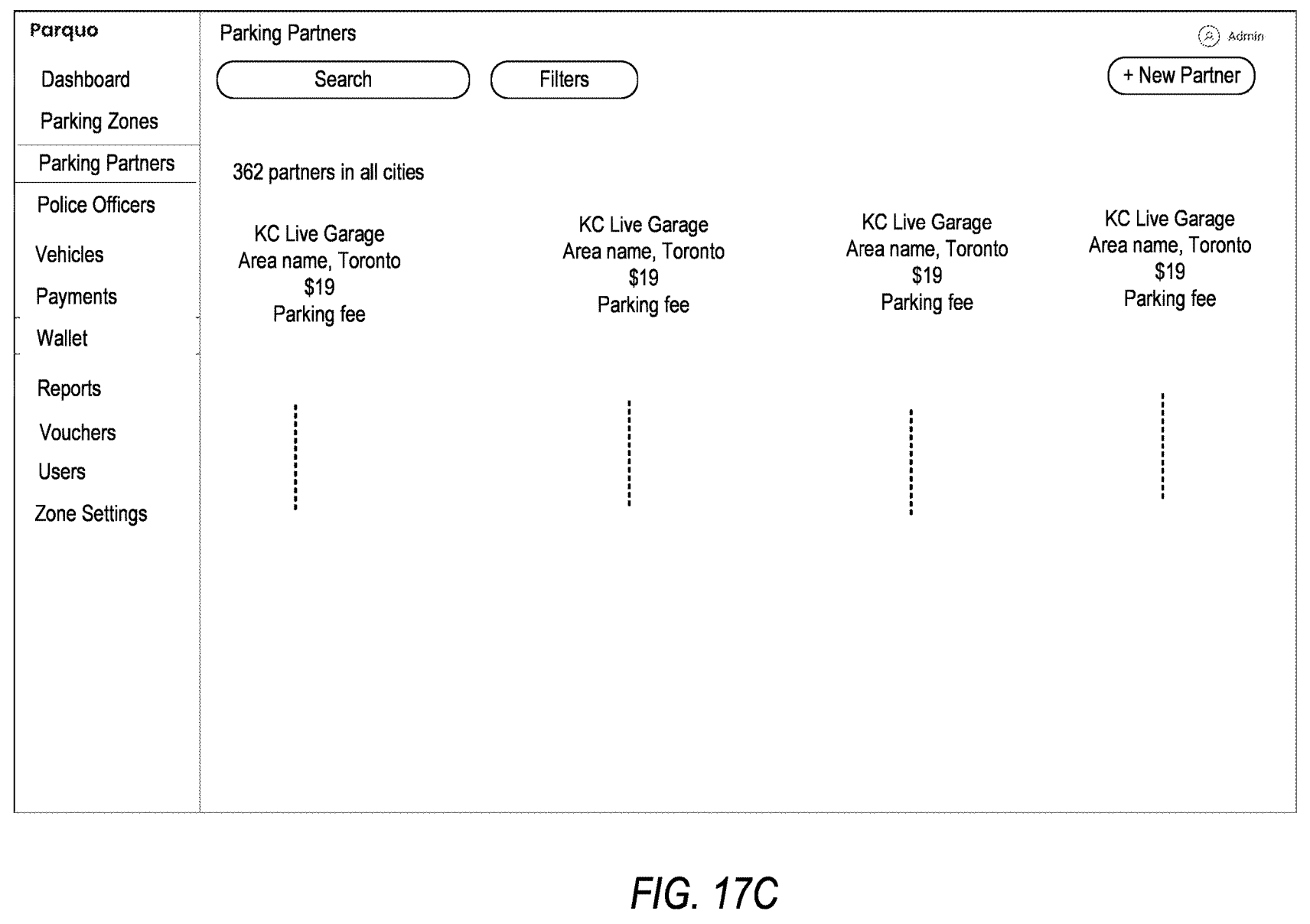

Parquo

Dashboard

Parking Zones

Parking Partners

Police Officers

Vehicles

Payments

Wallet

Reports

Vouchers

Users

Zone Settings

Parking Partners

Search

Filters

+ New Partner

Admin 362 partners in all cities

KC Live Garage
Area name, Toronto
$19
Parking fee

- - - - - - - - - - - - -

KC Live Garage
Area name, Toronto
$19
Parking fee

- - - - - - - - - - - - -

KC Live Garage
Area name, Toronto
$19
Parking fee

- - - - - - - - - - - - -

KC Live Garage
Area name, Toronto
$19
Parking fee

Parquo

Dashboard

Parking Zones

Parking Partners

Police Officers

Vehicles

Payments

Wallet

Reports

Vouchers

Users

Zone Settings

Police Officers

Search

All Cities

Admin 49 police officers in all cities

Mike Hales
Mike.hales@example.com
374980
Area name, Toronto

- - - - - - - - - - - - -

Mike Hales
Mike.hales@example.com
374980
Area name, Toronto

- - - - - - - - - - - - -

Mike Hales
Mike.hales@example.com
374980
Area name, Toronto

- - - - - - - - - - - - -

Mike Hales
Mike.hales@example.com
374980
Area name, Toronto

Parquo

Dashboard
Parking Zones
Parking Partners
Police Officers

Vehicles
Payments
Wallet
Reports
Vouchers
Users
Zone Settings

Admin

All Cities

Vehicles

Search 1,235 Vehicles in all cities

| License Plate No. | Vehicle Model | User | Private Parkings | Zone Parkings |
|---|---|---|---|---|
| JAE3467 Toronto | MBW M340 | Mike Hales | 02 | 02 |
| ------------ | ------------ | ------------ | ------------ | ------------ |

Parquo

Dashboard

Parking Zones

Parking Partners

Police Officers

Vehicles

Payments

Wallet

Reports

Vouchers

Users

Zone Settings

Wallet

Search

| $478,020 | -$23,725 | $32,490 |
| Wallets Balance | Spend Amount | Top-up Amount |

| User | Activity | Time & Date | Amount | Balance |
|---|---|---|---|---|
| Mike Hales | Paid at zone 382938 | Monday 12 Feb 2022, 12:23 PM | -$12 | $120 |

Admin

FIG. 17G

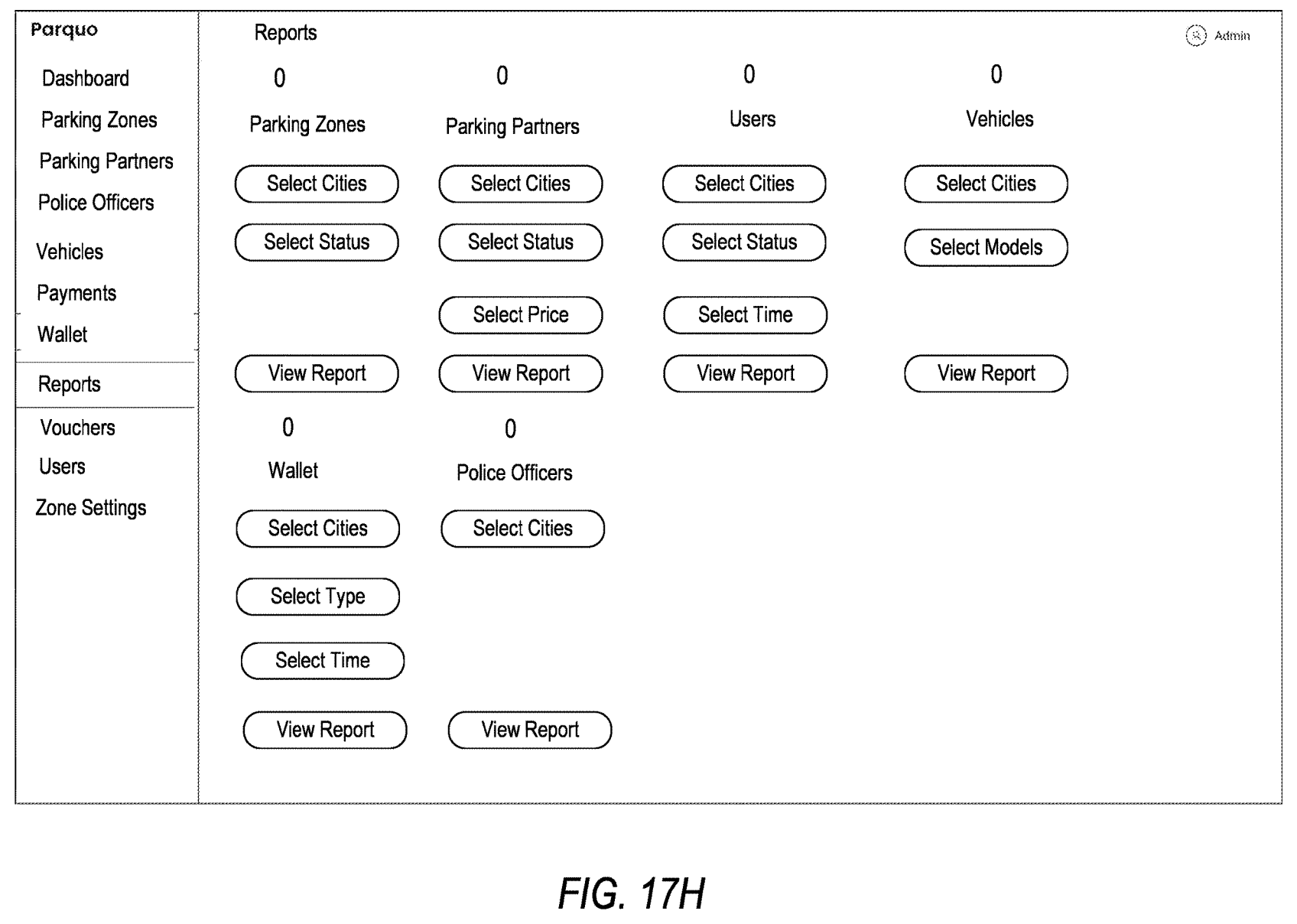

Parquo

Dashboard

Parking Zones

Parking Partners

Police Officers

Vehicles

Payments

Wallet

Reports

Vouchers

Users

Zone Settings

Reports

Admin

Parking Zones    0

Select Cities

Select Status

View Report

Wallet    0

Select Cities

Select Type

Select Time

View Report

Parking Partners    0

Select Cities

Select Status

Select Price

View Report

Police Officers    0

Select Cities

View Report

Users    0

Select Cities

Select Status

Select Time

View Report

Vehicles    0

Select Cities

Select Models

View Report

*FIG. 17H*

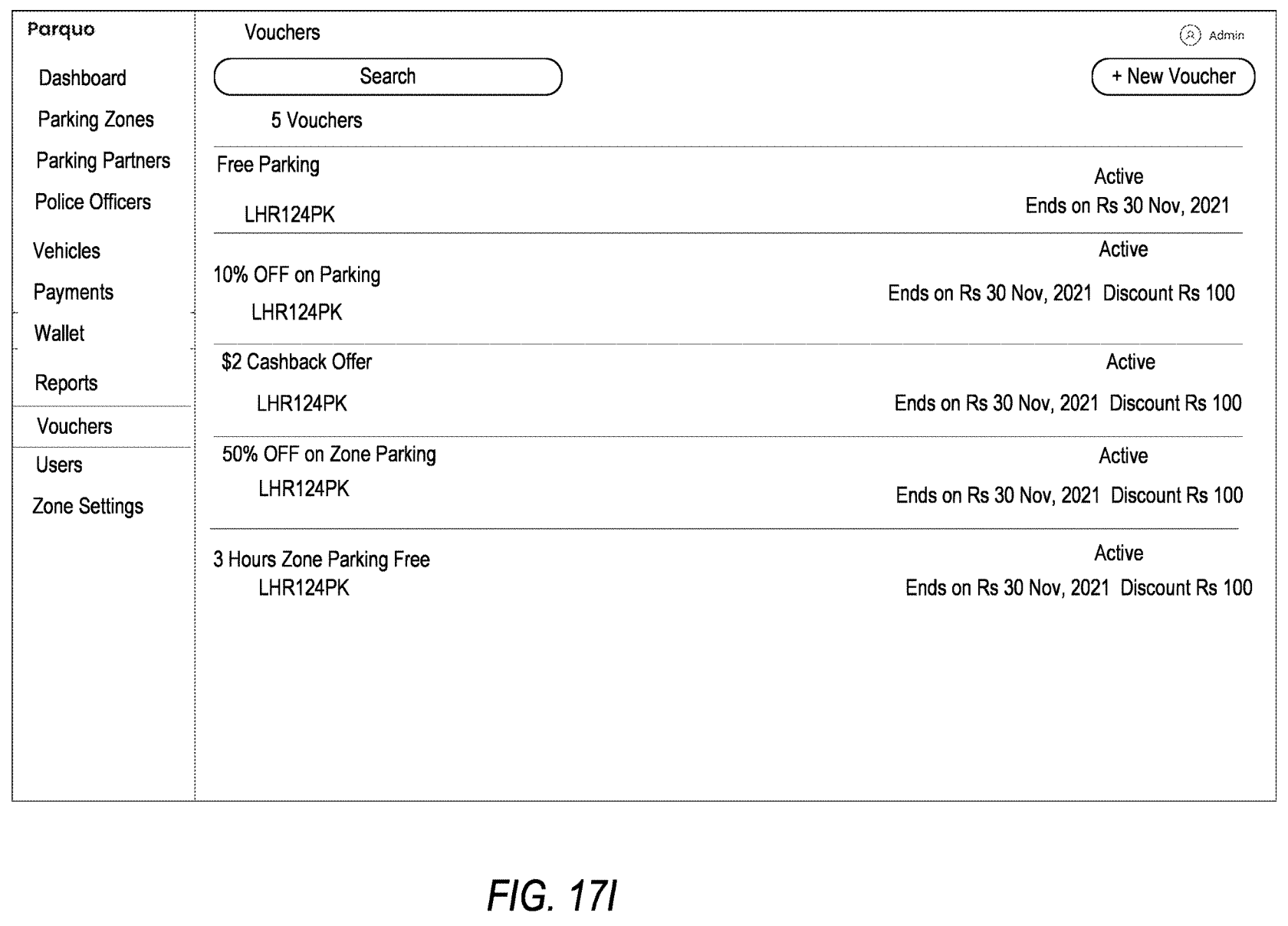

Parquo

Vouchers

Search

5 Vouchers

Admin

+ New Voucher

Dashboard

Parking Zones

Parking Partners

Police Officers

Vehicles

Payments

Wallet

Reports

Vouchers

Users

Zone Settings

Free Parking

LHR124PK

Active

Ends on Rs 30 Nov, 2021

10% OFF on Parking

LHR124PK

Active

Ends on Rs 30 Nov, 2021   Discount Rs 100

$2 Cashback Offer

LHR124PK

Active

Ends on Rs 30 Nov, 2021   Discount Rs 100

50% OFF on Zone Parking

LHR124PK

Active

Ends on Rs 30 Nov, 2021   Discount Rs 100

3 Hours Zone Parking Free

LHR124PK

Active

Ends on Rs 30 Nov, 2021   Discount Rs 100

FIG. 17I

Parquo

Dashboard
Parking Zones
Parking Partners
Police Officers
Vehicles
Payments
Wallet
Reports
Vouchers
Users
Zone Settings
Cities Users Search          Filters          All Cities          Admin 82,090 vehicles in all cities

| User | No. of Vehicles | City | Private Parking | Zone Parkings | Wallet Bal |
|---|---|---|---|---|---|
| Mike Hales | 2 | Toronto | 02 | 02 | $12 |
| Mike Hales | 1 | Toronto | 02 | 02 | $24 |
| Mike Hales | 2 | Toronto | 02 | 02 | $32 |

FIG. 17J

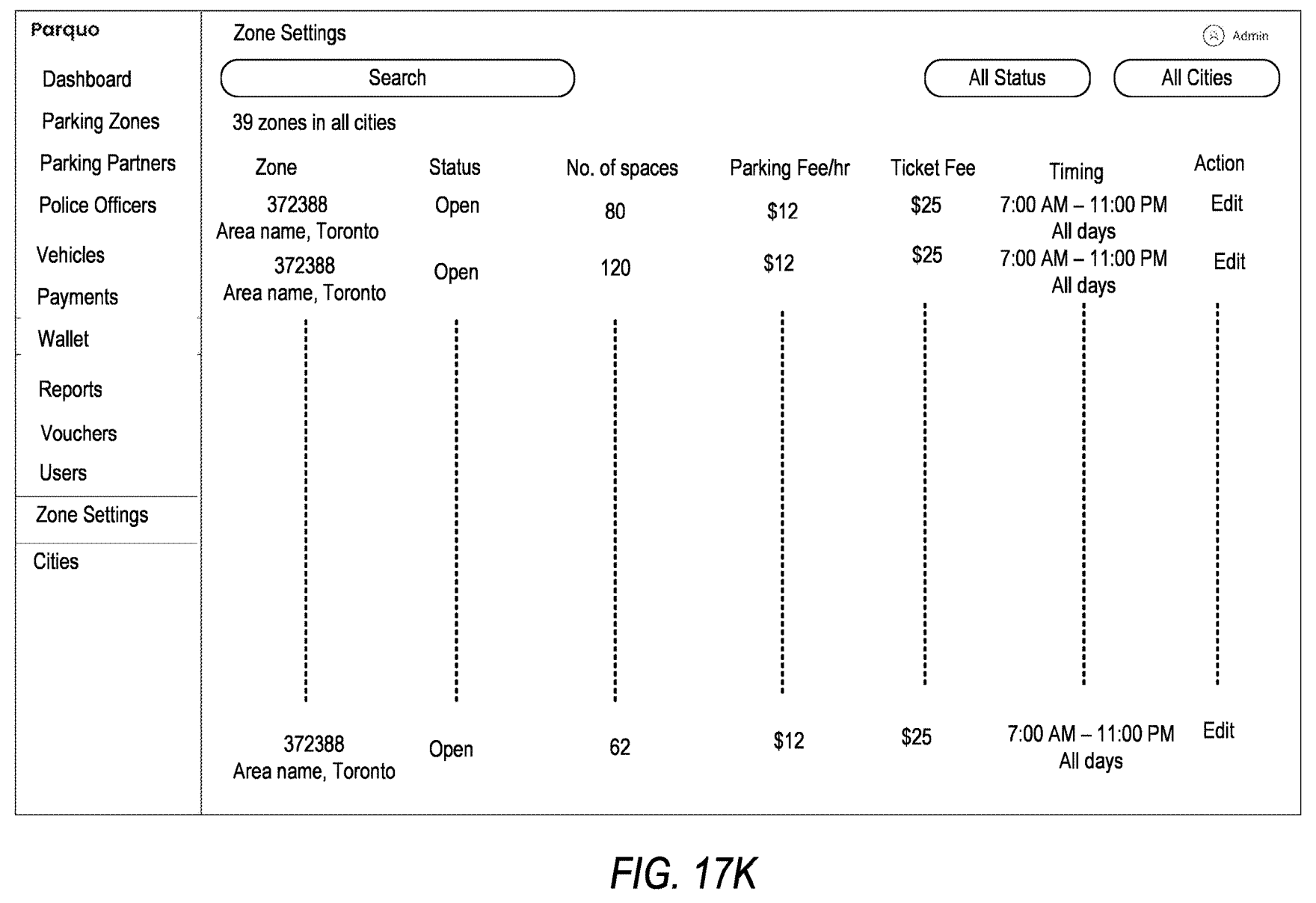

Parquo

Dashboard
Parking Zones
Parking Partners
Police Officers
Vehicles
Payments
Wallet
Reports
Vouchers
Users
Zone Settings
Cities Zone Settings Search     All Status     All Cities     Admin 39 zones in all cities

| Zone | Status | No. of spaces | Parking Fee/hr | Ticket Fee | Timing | Action |
|------|--------|---------------|----------------|------------|--------|--------|
| 372388 Area name, Toronto | Open | 80 | $12 | $25 | 7:00 AM – 11:00 PM All days | Edit |
| 372388 Area name, Toronto | Open | 120 | $12 | $25 | 7:00 AM – 11:00 PM All days | Edit |
| 372388 Area name, Toronto | Open | 62 | $12 | $25 | 7:00 AM – 11:00 PM All days | Edit |

FIG. 17K

Parquo

Admin

+ New City

Dashboard
Parking Zones
Parking Partners
Road Side Partners
Community
Complaints
Nearby Places
Ads
Police Officers
Vehicles
Payments
Wallet
Reports
Vouchers
Users
Settings Cities Toronto Area name
Area name
- - - - - - - - - - - - -
Area name Montreal Area name
Area name
- - - - - - - - - - - - -
Area name Calgary Area name
Area name
- - - - - - - - - - - - -
Area name Ottawa Area name
Area name
- - - - - - - - - - - - -
Area name Edmonton Area name
Area name
- - - - - - - - - - - - -
Area name Vancouver Area name
Area name
- - - - - - - - - - - - -
Area name

FIG. 17L

SYSTEMS AND METHODS FOR PARKING MANAGEMENT AND ENFORCEMENT

CROSS-REFERENCE TO RELATED APPLICATIONS

The application claims priority under 35 U.S.C. § 119(e) to U.S. Provisional Patent Application No. 63/268,192, titled "SYSTEMS AND METHODS FOR PARKING MANAGEMENT AND ENFORCEMENT," filed on Feb. 17, 2022, which is herein incorporated by reference in its entirety.

BACKGROUND

1. Field

The present disclosure relates in general to systems and methods for parking management, and more specifically, to systems and methods for smart parking management and enforcement.

2. Related Art

Many cities are planning their evolution into "Smart Cities" for the future. In general, a smart city is a technologically modern urban area that uses different types of electronic methods, voice activation methods and sensors to collect specific data. Information gained from that data is used to manage assets, resources and services efficiently; in return, that data is used to improve operations across the city. This includes data collected from citizens, devices, buildings and assets that is processed and analyzed to monitor and manage traffic and transportation systems, power plants, utilities, water supply networks, waste, crime detection, information systems, schools, libraries, hospitals, and other community services. Smart cities may be defined as smart both in the ways in which their governments harness technology as well as in how they monitor, analyze, plan, and govern the city.

In general, the smart city concept integrates information and communication technology (ICT), and various physical devices connected to the Internet of things (IoT) network to optimize the efficiency of city operations and services and connect to citizens. Smart city technology allows city officials to interact directly with both community and city infrastructure and to monitor what is happening in the city and how the city is evolving. ICT is used to enhance quality, performance and interactivity of urban services, to reduce costs and resource consumption and to increase contact between citizens and government. Smart city applications are developed to manage urban flows and allow for real-time responses. A smart city may, therefore, be more prepared to respond to challenges than one with a conventional "transactional" relationship with its citizens.

A problem that needs to be addressed for the success of this evolution will depend on updated parking technology because drivers, and eventually those in autonomous vehicles, will need to park in these smart cities. Making it easier to park for these drivers and vehicles will dramatically reduce congestion on the present and future city streets of these cities.

Unfortunately, at present, may cities have antiquated parking systems that include parking meters that are expensive to maintain, inefficient to operate, and require a large investment in personnel to physically enforce parking regulations. Additionally, these systems generally have inconvenient payment methods and an inability to pay remotely.

Also, these known systems generally cause consumer frustration because they force drives to search and hunt blindly for available spaces on the streets of a town or city or within a fixed area such as, for example, a parking structure. Moreover, once a parking space is found, these old systems make time tracking difficult for consumers and increase the probability that a driver will forget where the parking space is once they leave their vehicle in the space. Furthermore, these old systems require that if a driver that needs to extend time in the parking space, that driver will have to physically return to the parking space before a violation is triggered.

Specifically, these old systems do not provide a driver with the location of an available parking space, allow the driver to reserve the parking space, allow the driver to conveniently pay for the parking, provide the driver with a receipt, and allow for the parking to be paid remotely. Additionally, these old system forces the driver to remember where the vehicle is parked and requires the driver to keep track of the time elapsed by an independent means. Specifically, if people need to stay longer than the amount of time they initially purchased, they need to physically return to the meter to add more money. This is inconvenient and may mean interrupting meals, business meetings, dates, or activities. It is also very easy to lose track of time and have to pay fines when they are unable to return to their metered parking space in time.

From an enforcement perspective, these old systems have parking meters that require parking enforcement personnel to physically inspect each parking spot multiple times per day to enforce time limits and, if in violation, write citations. Moreover, many of the older model parking meters require the use of coins for payment, which are inconvenient for consumers and requires the physical collection of coins and cash deposits on a regular basis by the parking management personnel.

As such, there is a need for a system and method to address these problems.

SUMMARY

Disclosed is a parking management and enforcement (PME) system for managing parking at a plurality of parking spaces. The PME system comprises a controller and a server. The controller is in signal communication with a sensor located proximate to a parking space of the plurality of parking spaces and the sensor is configured to determine the presence of a vehicle in the parking space. The server is in signal communication with the controller and the server includes a network application, parking space database, scheduler, and payment system. The parking space database is located on a storage device on the server. The network application is configured to receive parking requests from a user via a mobile client device and the parking space database includes information about the plurality of parking spaces. The scheduler is configured to determine an available parking space for the user based on the parking space database and the sensor via the controller, and the payment system is configured to receive electronic payment for the parking space from the user. The scheduler is configured to reserve the available parking space for the user.

Also disclosed is a PME system comprising a controller and server where the controller is in signal communication with the sensor located proximate to the parking space of the plurality of parking spaces and the sensor is configured to determine the presence of the vehicle in the parking space. The server is in signal communication with the controller and includes a computer-readable medium having executable instructions and a processor. The processor is in signal communication with the communications interface and the computer-readable medium and the processor configured to perform operations based on the executable instructions. The processor performs operations that include receiving a parking request from a user via a mobile client device, determining an available parking space for the user using the parking space database, receiving electronic payment for the parking space from the user, and reserving the available parking space for the user.

As an example of operation, the PME system performs a method that comprises receiving at a server a parking request from a user via a mobile client device; determining with the server an available parking space for the user using the parking space database; receiving electronic payment for the parking space from the user; and reserving the available parking space for the user with the server.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 16 is a front view of an example of an implementation of a smart sign in accordance with the present disclosure.

Figure 17D:
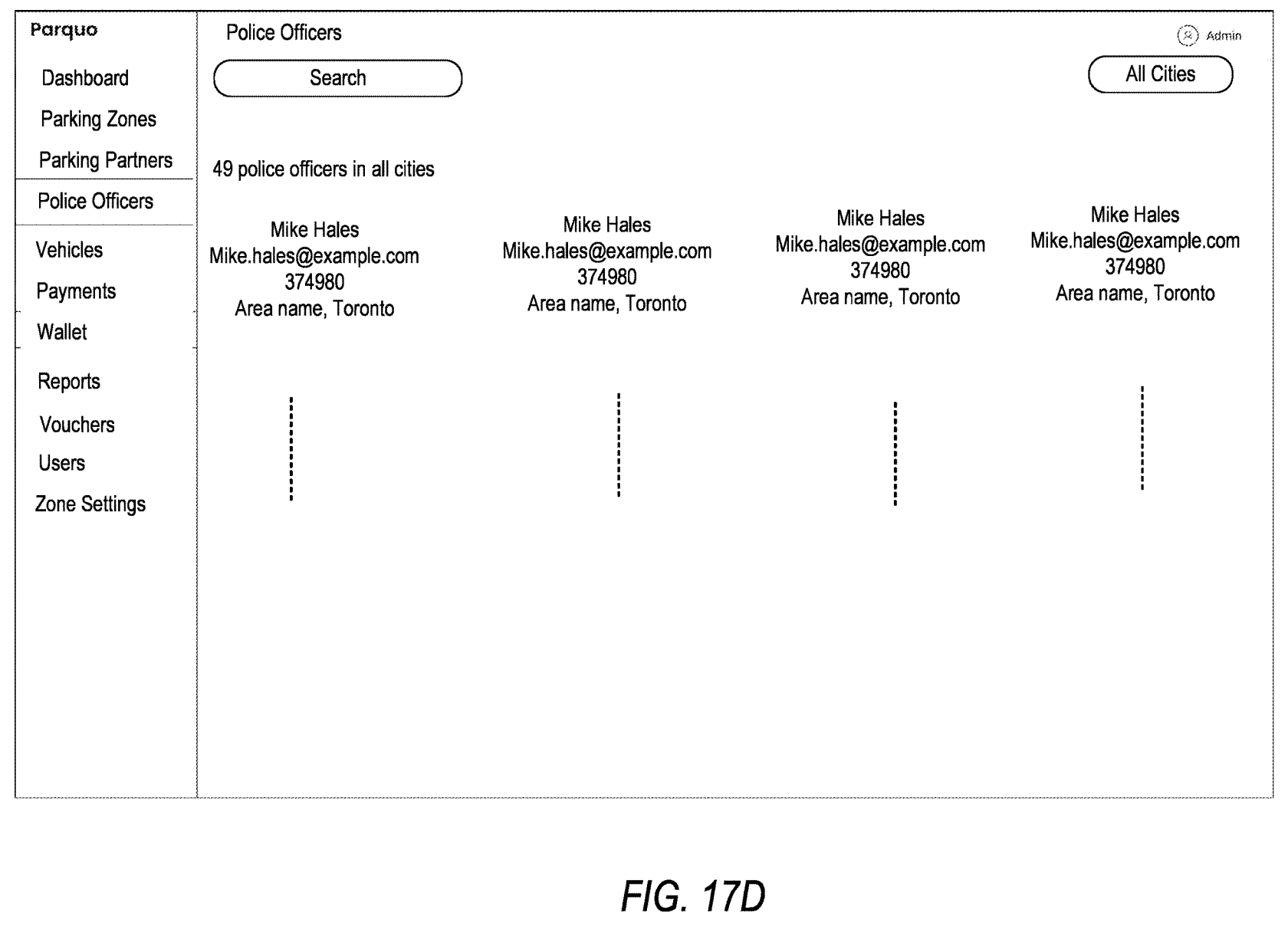
Figure 17F:
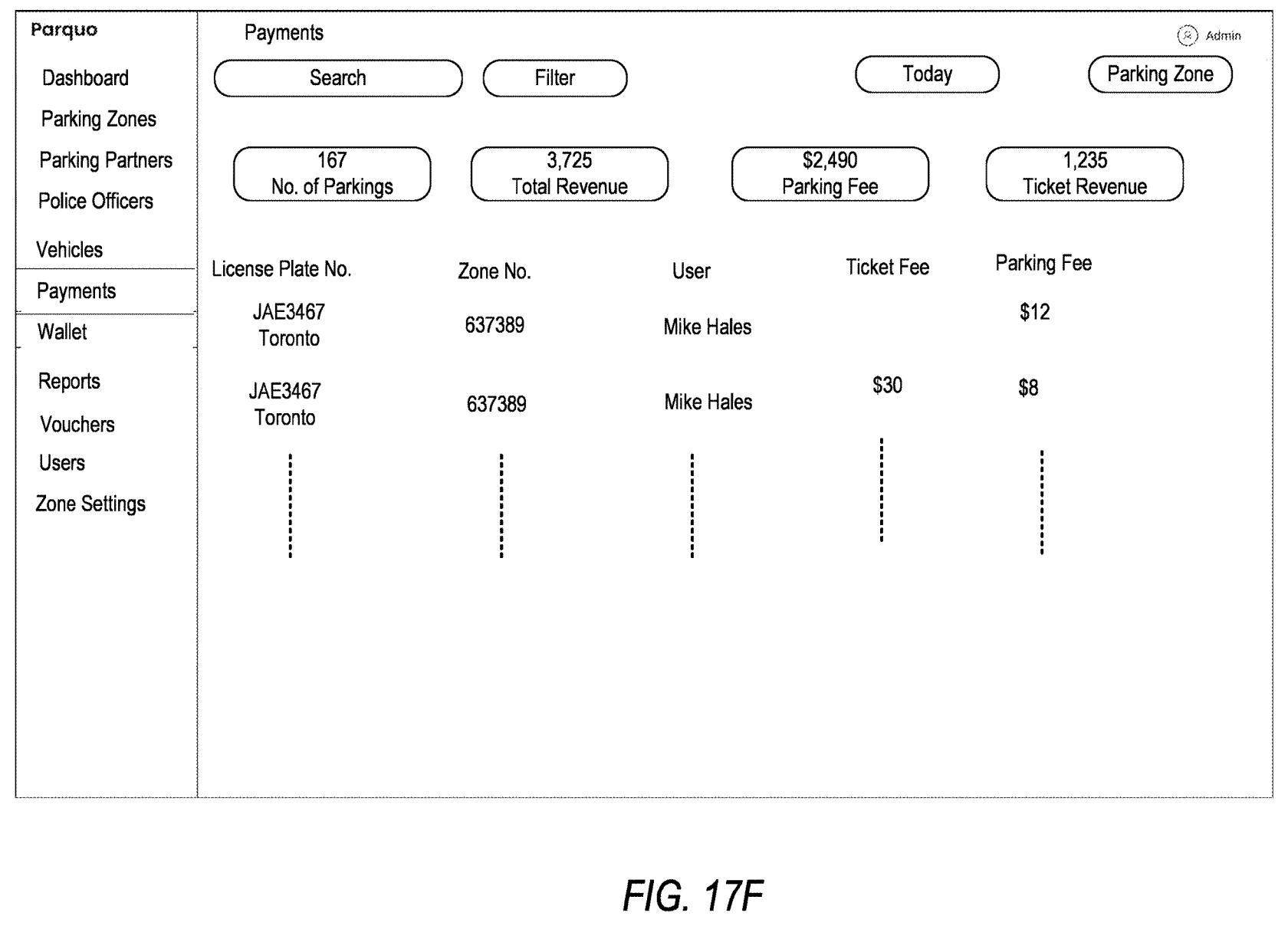

FIG. 17A-17L are screen shots of an example of an implementation of a dashboard GUI for use with the system for parking management and enforcement in accordance with the present disclosure.

DETAILED DESCRIPTION

Disclosed is a parking management and enforcement (PME) system for managing parking at a plurality of parking spaces. The PME system comprises a controller and a server. The controller is in signal communication with a sensor located proximate to a parking space of the plurality of parking spaces and the sensor is configured to determine the presence of a vehicle in the parking space. The server is in signal communication with the controller and the server includes a network application, parking space database, scheduler, and payment system. The parking space database is located on a storage device on the server. The network application is configured to receive parking requests from a user via a mobile client device and the parking space database includes information about the plurality of parking spaces. The scheduler is configured to determine an available parking space for the user based on the parking space database and the sensor via the controller, and the payment system is configured to receive electronic payment for the parking space from the user. The scheduler is configured to reserve the available parking space for the user.

Also disclosed is a PME system comprising a controller and server where the controller is in signal communication with the sensor located proximate to the parking space of the plurality of parking spaces and the sensor is configured to determine the presence of the vehicle in the parking space. The server is in signal communication with the controller and includes a computer-readable medium having executable instructions and a processor. The processor is in signal communication with the communications interface and the computer-readable medium and the processor configured to perform operations based on the executable instructions. The processor performs operations that include receiving a parking request from a user via a mobile client device, determining an available parking space for the user using the parking space database and optionally the sensor via the controller, receiving electronic payment for the parking space from the user, and reserving the available parking space for the user.

As an example of operation, the PME system performs a method that comprises receiving at a server a parking request from a user via a mobile client device; determining with the server an available parking space for the user using the parking space database and optionally the sensor via the controller; receiving electronic payment for the parking space from the user; and reserving the available parking space for the user with the server.

Figure 1:
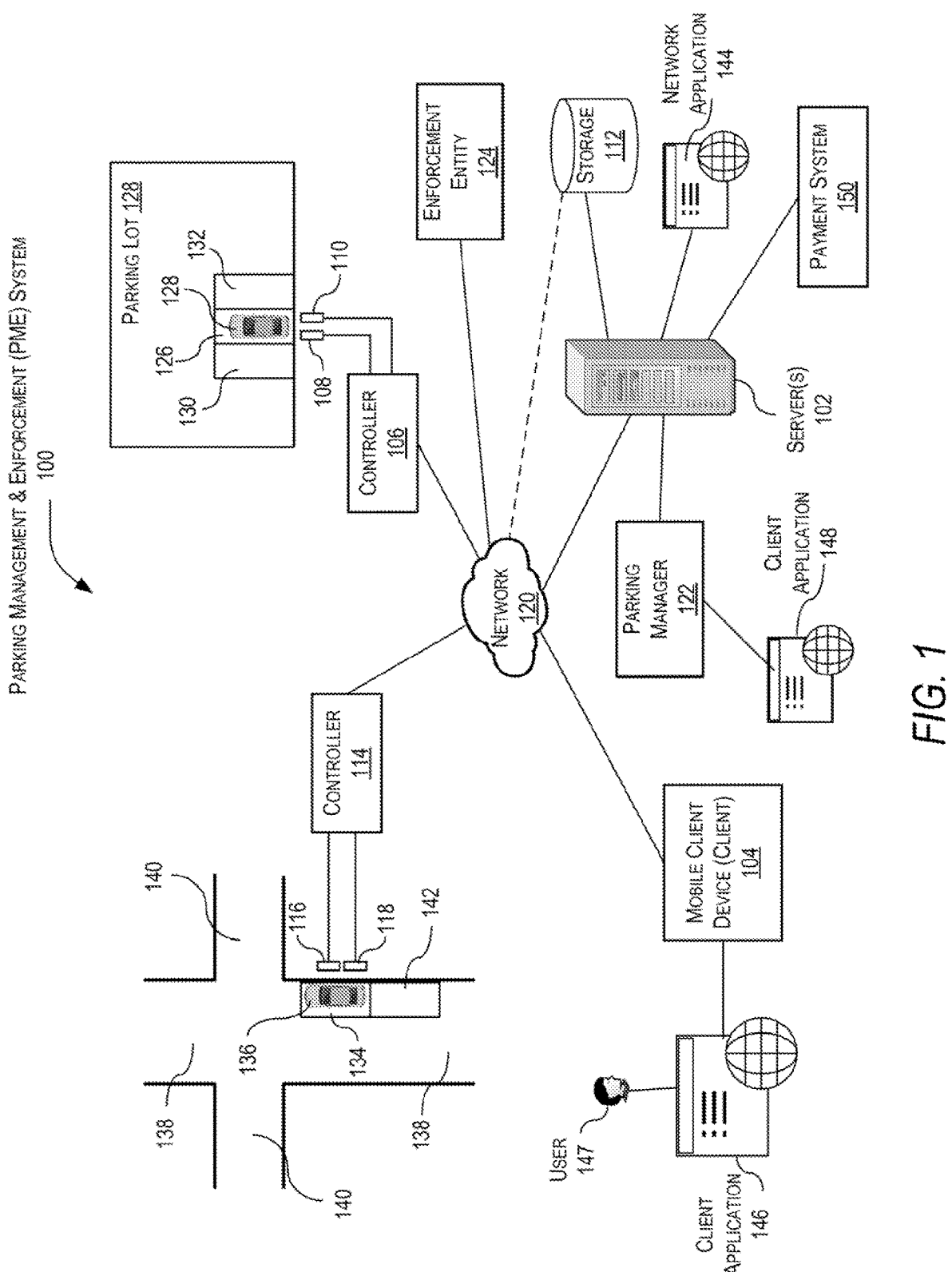
FIG. 1 is a system block diagram of an example of an implementation of a parking management and enforcement system (PME) system in accordance with the present disclosure.

In FIG. 1, a system block diagram of an example of an implementation of a parking management and enforcement system (PME) system 100 is shown in accordance with the present disclosure. The PME system 100 may include one or more servers 102, a mobile client device (herein referred to simply as a client) 104, a controller 106, a sensor 108, an output device 110, and a storage device 112. The PME system 100 may also include a second controller 114, a second sensor 116, and a send output device 118. The one or more servers 102 may be in signal communication with the client 104, controller 106, and second controller 114 via a telecommunication network 120 such as, for example, the Internet. The controller 106 is in signal communication with the sensor 108 and output device 110 and the second controller 114 is in signal communication with the second sensor 116 and second output device 118. As such, the one or more servers 102 are in signal communication with the sensor 108, output device 110, second sensor 116, and second output device 118 via the controller 106 and second controller 114, respectively. Additionally, the one or more servers 102 may be also in signal communication with the storage device 112 and a parking manager 122, either directly or via the telecommunication network 120, and an enforcement entity 124.

In this example, the sensor 108 and output device 110 may be located at a parking space 126 within a parking lot 128, where the sensor 108 and output device 110 may be incorporated in a "smart sign." Where the smart sign is configured to scan the parking space 126 with, for example, a camera, video camera, imaging sensor, radar, etc. to determine is the parking space is empty or occupied by a vehicle. The optional output device 110 may be any output device capable of communicating information to the user 147 of the vehicle such as, for example, a video display, colored or white light source, or other type of display. As an example, the output device 110 may include information that identifies the parking space 126 such that the user 147 is able to communicate with the servers 102 utilizing the information to establish a parking session and pay electronically for the parking fee via the client application 146. The parking space 126 may include a parked vehicle 128 parked between two empty spaces 130 and 132. While not shown because of the ease of illustration, it is appreciated that each parking space in the parking lot 128 may also include a sensor and an output device that are also in signal communication the one or more servers 102. In this example, all of the sensors (including sensor 108) and output devices (including output device 110) in the parking lot 128 may be in signal communication with a single controller (i.e., controller 106) or with multiple controllers (not shown) where each controller is in signal communication with a pair device including a sensor and an output device of a corresponding parking space in the parking lot 128, or any combination of sensors and output devices to the one or more controllers (i.e., controller 106).

Similarly, the second sensor 116 and second output device 118 may be located at a parking space 134 having another vehicle 136 outside of the parking lot 128 on a first street 138 next to an intersection with a second street 140. In this example, there may be multiple parking spaces along the first street 138 that includes the parking space 134 and an empty space 142. Similar to the previous discussion related to the parking lot 128, while not shown because of the ease of illustration, it is appreciated that each parking space along the first street 138 (or along the second street 140) may also include a sensor and an output device that are also in signal communication the one or more servers 102. In this example, all of the sensors (including second sensor 116) and output devices (including second output device 118) along the first street 138 or second street 140 may be in signal communication with a single controller (i.e., second controller 114) or with multiple controllers (not shown) where each controller is in signal communication with a pair device including a sensor and an output device of a corresponding parking space along the first street 138 and second street 140, or any combination of sensors and output devices to the one or more controllers (i.e., second controller 114). As described earlier, the individual sensor and output device may be incorporated into smart signs that are able to sense the presence of a vehicle in the space and communicate information to the parked vehicle. The smart signs may allow provide the user 147 with information identifying the parking space 134 and a way to rent the parking space and pay for the parking fees electronically via the client application 146.

In this example, the PME System 100 includes a complete parking system that may be integrated with law enforcement via the enforcement entity 124. The PME System 100 may be operated, controlled, and managed by the parking manager 122 that may be: one or more persons; a business entity, such as, for example, a private parking lot; a government entity such as, for example a municipality that manages public parking lots or public parking spaces on the streets (i.e., first street 138 and/or second street 140) of the municipality; or an organization that manages parking spaces for businesses or governmental agencies. In this disclosure, parking garages are included in the definition of a parking lot. The PME System 100 is a smart system that allows either parking manager 122 and/or the one or more servers 102 to manage the parking spaces in either public or private parking spots along streets or parking lots (i.e., parking lot 128). In this example, the combination of the controller, sensor, and output device (i.e., controllers 106 and 114, sensors 108 and 116, and output devices 110 and 118, respectively) may be utilized as a means for sensing the presence of a vehicle 128 or 136 in the parking spaces 126 or 134 that allows for the utilization of the smart signs.

As an example of government related implementation, the parking manager 122 may be either a government agency such as, for example, a parking department of a city or municipality or a private entity that is partnered with the city or municipality to manage the street parking (i.e., parking space 134) or parking lots (i.e., parking lot 128) of the city or municipality. In this example, the city or municipality has a map of all the parking spaces that can be managed by the parking manager 122 and the enforcement of the parking spaces may be accomplished by the parking manager 122 with the assistance of the police and/or traffic department (i.e., enforcement entity 124) of the city or municipality.

The PME System 100 is a system and method for managing and enforcing parking in either private or public locations that combines hardware such as, for example, the one or more servers 102 with monitoring and notification systems (i.e., controllers 106 and 114, sensors 108 and 116, and output devices 110 and 118, respectively), and software to control and manages these hardware devices and/or components. As an example, when utilized with public parking lots and spaces, the PME System 100 may be scaled to manage an entire infrastructure of a given municipality's public parking management.

In this example, the storage device 112 may be memory device that is either internal to or remote from the one or more servers 102 via the telecommunication network 120. For the purposes of simplicity of explanation, the one or more servers 102 will be described as a single server; however it is appreciated by those of ordinary skill in the art that multiple servers may be utilized to distribute the processing, managing, and storage of instructions and information utilized by the PME System 100. In the case of multiple servers, the individual servers of the one or more servers 102 may be each located optionally within the same location (e.g., the location of the parking manager 122, parking lot 128, etc.) or distinctly remote locations that are in signal communication via the telecommunication network 120.

In this example, the controller 106 is shown in signal communication with the sensor 108 and the output device 110 associated with the parking space 126 in the parking lot 128; however, it is appreciated by those of ordinary skill in the art that the controller 106 may alternatively be in signal communication with all of the sensors and output devices associated with all of the parking spaces (including parking spaces 126, 130, and 132) of the parking lot 128 or a sub-plurality of the all the sensors and output devices if other controllers are present to monitor and control other sensors and output devices within the parking lot 128. Similarly, the second controller 114 may be in signal communication with all of the sensors and output devices (including second sensor 116 and output device 118) along the first street 138 and second street 140 or a sub-plurality of the all the sensors and output devices if other controllers are present to monitor and control other sensors and output devices along the first street 138 and second street 140.

The one or more servers 102 includes at least a single server that is a computing hardware device (having one or more processors) or software on a computing device that is equipped with specific hardware and/or software programs that provides and/or enables functionality for other hardware devices or software programs such as, for example, services to other computing devices generally known as clients. The server receives, stores, and sends data to the clients over a network for various functions. The server includes networking circuitry to interface with and communicate with remote devices such as the controller 106, second controller 114, client 104, enforcement entity 124, optionally remote storage device 112, and optionally remote parking manager 122. In this example, the one or more servers 102 may be interfaced via a network application 144 such as, for example, a webpage on the Internet such that a user 147 of the client 100 and parking manager 122 may access the network application 100 via a local application 146 and 148 on computing devices at the client 104 and parking manager 122, respectively. The one or more servers 102 may also include a payment system 150 that is configured to receive electronic payments from the user 147 for a parking space.

The one or more servers 102 may represent any type of computing device having one or more processing units (i.e., processors) in signal communication to a computer-readable media via a bus, which in some instances may include one or more of a system bus, a data bus, an address bus, a PCI bus, a Mini-PCI bus, and any variety of local, peripheral, and/or independent buses. Executable instructions stored on the computer-readable media can include, for example, an operating system, a client communication module, a profile module, and other modules, programs, or applications that are loadable and executable by the one or more processing units.

The controllers (i.e., controller 106 and second controller 114) are devices that control the sensors and output devices and administer the collection and communication of data from the sensors to the one or more servers 102 and the communication and display or transmission of notifications from the one or more servers 102 to the sensors and output devices. The controllers may be hardware devices such as, for example, a computing device having at least a single processor, a specific microprocessor device, an application specific integrated circuit (ASIC), or other similar device that is configured to process instructions that are either based on software that is loaded on to the controller or hardware wired into the controller. As an example, the controller 106 may be computer system running software that controls and manages the sensor 108 and output device 110; and communicates with the one or more servers 102 via the telecommunication network 120. In this example, the controller 106 may include network interface circuitry configured to communicated with the one or more servers 102 via the telecommunication network 120. In an alternative example where the one or more servers 102 is physically located at the parking lot 128, the controller 106 may be incorporated in the one or more servers 102.

In this example, the telecommunication network 120 may include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, 5G, and so forth) or any combination thereof. The telecommunication network 120 may utilize communications protocols, including packet-based and/or datagram-based protocols such as Internet protocol ("IP"), transmission control protocol ("TCP"), user datagram protocol ("UDP"), or other types of protocols. Moreover, the telecommunication network 120 may also include a number of devices that facilitate network communications and/or form a hardware basis for the networks, such as switches, routers, gateways, access points, firewalls, base stations, repeaters, backbone devices, and the like.

In some examples, the telecommunication network 120 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11 g, 802.11n, and so forth), and other standards.

It is appreciated by those skilled in the art that the circuits, components, modules, and/or devices of, or associated with, the one or more server 102, controller 106, second controller 114, and client 104 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

In this example, the client 104 may be a computer, portable computer, server, mobile device (such as a smart telephone, tablet, etc.), a vehicle communication system, etc. that is usable by the user 147 (also referred to herein as a customer) of the client 104. Thus, although illustrated as a single type of device, the client 104 may include a diverse variety of device types and are not limited to a particular type of device. The client 104 may represent, but is not limited to, server computers, desktop computers, web-server computers, personal computers, mobile computers, laptop computers, tablet computers, vehicle communication system, mobile-type devices, special purpose-type devices, embedded-type devices, wearable-type devices, or any other sort of computing device.

In some implementations, the client 104 includes one or more input/output ("I/O") interfaces (not shown) that enable communications with input/output devices such as user input devices including peripheral input devices (e.g., a keyboard, a mouse, a pen, a voice input device, a touch input device, a gestural input device, and the like) and/or output devices including peripheral output devices (e.g., a display, a printer, audio speakers, a haptic output device, and the like). The client 104 may also include a combination of two or more devices, such as a mobile phone in combination with a wearable device or vehicle entertainment and/or communication system. In this example, the client 104 includes a display configured to display the client application 146 for the user 150.

The client 104 may represent any type of computing device having one or more processing units (i.e., processors) in signal communication to a computer-readable media via a bus, which in some instances may include one or more of a system bus, a data bus, an address bus, a PCI bus, a Mini-PCI bus, and any variety of local, peripheral, and/or independent buses. Executable instructions stored on the computer-readable media can include, for example, an operating system, a client communication module, a profile module, and other modules, programs, or applications that are loadable and executable by the one or more processing units.

Figure 2:
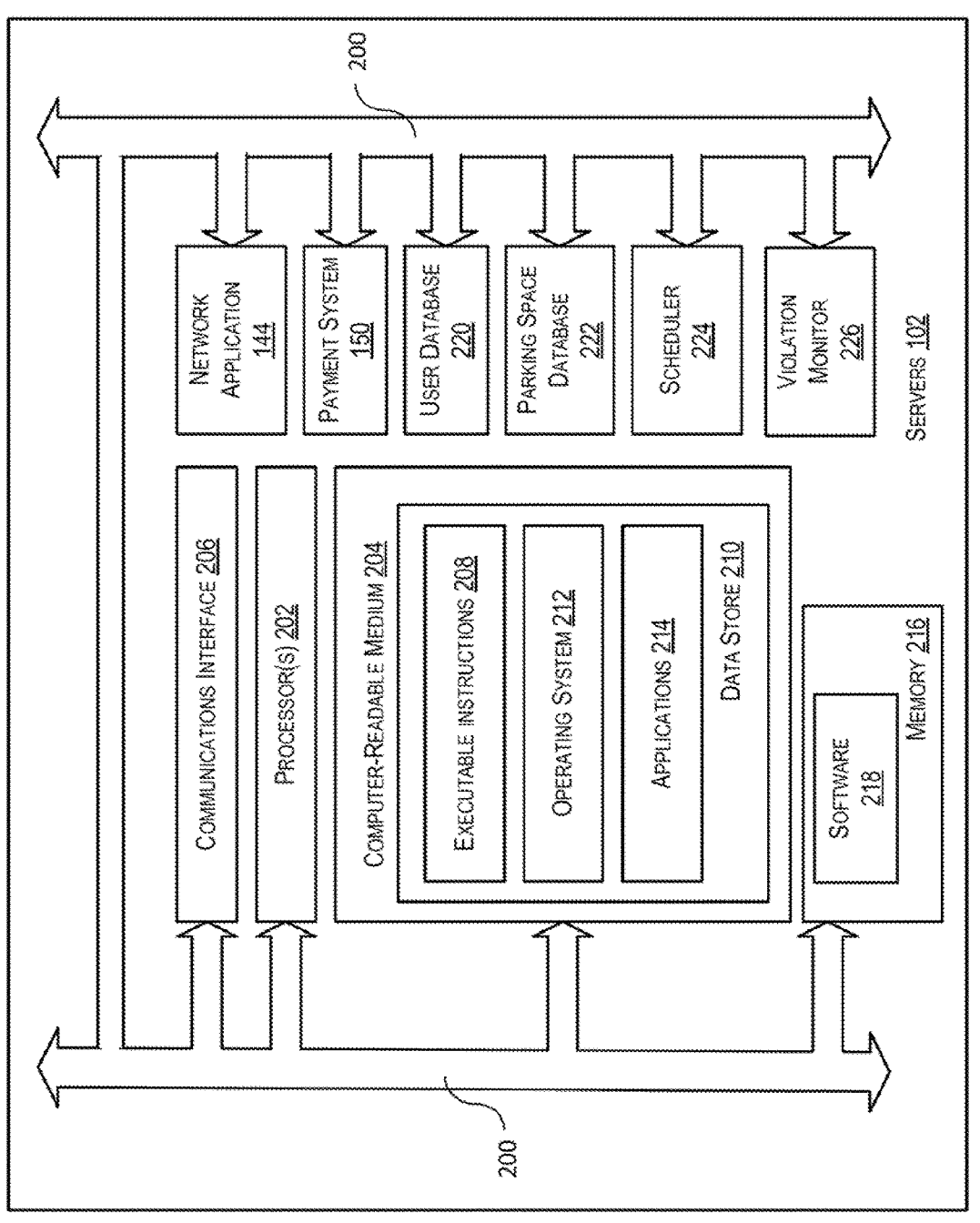
FIG. 2 is a system block diagram of an example of an implementation of a server of the one or more servers shown in FIG. 1 in accordance with the present disclosure.

In FIG. 2, a system diagram of an example of an implementation of a server of the one or more servers 102 (herein referred to simply as server 102) is shown in accordance with the present disclosure. In this example, the components of the server 102 are in signal communication and operatively connected, for example, via a bus 200, which can include one or more of a system bus, a data bus, an address bus, a PCI bus, a Mini-PCI bus, and any variety of local, peripheral, and/or independent buses. In this example, the sever 102 may include one or more processing unit(s)/ processor(s) 202, computer-readable media 204, and/or communication interface(s) 206. The components of the server 102 are in signal communication and operatively connected, for example, via the bus 200.

As utilized herein, the processor(s) 202 may represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized in this disclosure, a computer-readable media, such as computer-readable media 204 may store instructions executable by the processor(s) 202. The computer-readable media 204 may also store executable instructions 208 that may be executable by the processor(s) 202 and/or external processing units (not shown) such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in processor(s) 202, while in some examples one or more of a CPU, GPU, and/or accelerator may be external to a processor(s) 202 and/or server 102.

The computer-readable media 204 may include computer storage media (i.e., data store 210) and/or communication media. The data store 210 may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, data store 210 includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The data store 210 may be optionally the same as or in addition to the storage device 112.

In this example, the computer-readable medium 204 (also known as computer-readable media, machine-readable medium, machine-readable media, etc.) may also include software such as an operating system 212 to control and operate the server 102 and application programs 214 to configure and enable the server 102 to do numerous operations and/or functions.

In some examples, the data store 210 includes data storage such as a database, data warehouse, or other type of structured or unstructured data storage. In some examples, the data store 210 includes a corpus and/or a relational database with one or more tables, indices, stored procedures, and so forth to enable data access including one or more of hyper-text markup language ("HTML") tables, resource description framework ("RDF") tables, web ontology language ("OWL") tables, and/or extensible markup language ("XML") tables, for example.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

The server 102 may also include a memory 216 that is configured to store software 218, the network application 144, the payment system 150, a user database 220, parking space database 222, scheduler 224, and violation monitor 226.

In this example, the payment system 150, a user database 220, parking space database 222, scheduler 224, and violation monitor 226 may optionally be implemented as components, devices, or modules that are hardware, software, or both within the servers 102. The payment system 150 may also be implemented as a standalone system that is remote from but in signal communication with the server 102.

In this example, the memory 216 may be implemented as memory module such as, for example, a RAM, DRAM, PCM, ROM, EPROM, EEPROM, CD-ROM, DVD, Universal Serial Bus (USB), or other similar type of devices. The memory 216 is in signal communication with the bus 200 such that the software 218 is useable by other devices of the server 102 such as, for example, the processor(s) 202, computer-readable medium 204, the communications interface 206, payment system 150, a user database 220, parking space database 222, scheduler 224, and violation monitor 226.

In this example, the communication interface 206 may represent, for example, network interface controllers ("NICs") or other types of transceiver devices to send and receive communications over a network.

In general, the PME system 100 includes a parking solution combining a software platform for managing parking spaces, a mobile phone application (i.e., the client application 146) for customer interaction (i.e., the user 147), and an application programming interface (API) (i.e., the network application 144) for integration with municipalities' parking enforcement division systems (i.e., the enforcement entity 124). The PME system 100 is suitable for deployment in private parking lots and garages and public parking lots. When utilized with public parking lots, the smart systems allow for high value because they may be utilized to manage the entire infrastructure for a given locality's public parking management. The PME system 100 may include hardware components that monitor the physical parking spots.

In this disclosure, the PME system 100 may include the secure mobile application (i.e., the client application 146) that allows customers (i.e., user 147) to enter and save their payment information for future use. Each vehicle the customer operates can be saved to a profile associated with the customer's account, with one car optionally being set as the default for the account. The profile may store the registration number, make, model, and year of a vehicle.

The PME system 100 is configured to allows each vehicle of the user 147 to be associated with a mobile telephone number of the user 147. As such, the license plate number of the vehicle may be associated with mobile telephone number of the user 147 in the user database 220 as part of the identification information of the user 147 and the vehicles registered to the user 147.

When seeking a parking space, the customer (i.e., the user 147) can consult the mobile phone application (i.e., client application 146) to receive location information for nearby vacant parking spaces. Once the customer has parked, the client application 146 can be used to make the initial selection of parking time needed, verify the number of the parking space occupied, and choose the car profile to be parked if it is not the default car for the account. Once the purchase is complete, a confirmation will be received, which verifies the parking space location, the vehicle parked, time parked, and the time of expiration.

As an example, fifteen minutes before the time is set to expire, the client application 146 may receive a notification of expiration. The user 147 can then retrieve the vehicle or purchase additional time, up to any preset maximum parking time allowed by the municipality or lot owner (i.e., parking manager 122).

If a user 147 forgets where the vehicle is parked, GPS built into the mobile client device 104 can guide the user 147 back to the parking spot. Moreover, the PME system 100 hardware and software (i.e., scheduler 224 in combination with the parking space database 222) tracks/monitors all available parking spaces in its dataset (i.e., the parking space database 222). This data can be configured to manage a single location like a private parking lot or garage, a chain of private parking lots, or an entire city's public parking locations.

The combination of software and hardware monitoring of spaces allows the PME system 100 to know whether a given space is currently occupied. The smart systems of the PME system 100 can be queried by the client application 146 of the user 147 to acquire locations of vacant spaces. The PME system 100 also tracks and monitors all-time, payment, and expiration information for each parking session (i.e., via the payment system 150, scheduler 224, violation monitor 226, and other devices, components, or modules of the servers 102).

In these examples, the PME system 100 may be designed with hardware and/or software configured to be integrated with local law enforcement's (i.e., the enforcement entity 124) parking management and citation systems. When the PME system 100 identifies that space is occupied past the expiration time, a violation flag is set, and the system automatically creates a parking ticket (i.e., the violation monitor 226). The offending customer's client application 146 will receive a notification indicating the violation and a citation number with a description of the parking offense and instructions regarding filing a dispute or making payment of the parking fine.

The PME system 100 also allow self-driving vehicles to bypass the client application 146 and have a fully automated parking session enabled by a smart vehicle software. Moreover, the PME system 100 utilizes the Internet of Things (IoT) technologies used for the interaction of the hardware with the app and open platform. In this disclosure, the PME system 100 is designed for public use and private parking management.

The disclosed PME system 100 allows drivers/customers (i.e., the user 147) the convenience of not needing to have cash or coins to pay parking meters and the PME system 100 allows customers the ability to pay by mobile device, track the time remaining, and purchase additional time all without having to disrupt their current activity. Moreover, the PME system 100 allows municipalities to reduce personnel costs by eliminating the need to maintain a mobile parking enforcement team to physically check the status of parking spaces and write paper tickets for violations. As such, since paper is removed from the PME system 100, there is less opportunity for clerical errors.

Moreover, the efficiency of mobile payments and the notifications sent to warn drivers when time is close to expiring reduces the number of violations and, therefore, lower the court costs of processing citations. Also, since the PME system 100 is always on and monitoring every parking spot, all violations are recorded, a feat that would require an impractically large parking enforcement division to duplicate with human monitoring.

The municipality also benefits from being able to remove expensive and unsightly parking meters and saving labor by not having to collect cash and coins from meters scattered throughout a city.

In general, the PME system 100 allows customers (i.e., including the user 147) to have a grace period, for example, five minutes, to purchase more time for their parked vehicles so that they do not get a parking violation. If they do not purchase the additional time, they will automatically be issued a violation (i.e., a parking ticket) via, for example, a text message on their smartphone or other mobile device.

The PME system 100 also allows parking lots to street parking to save on hardware equipment because parking meters may be replaced with smart signs. In some of these applications, the parking revenues may be shared with the private parking lot, municipality, and/or police department. Moreover, the PME system 100 allows customers (i.e., user 147), who bought too much parking time because they have to leave early, to sell their spots to other customers that can buy their remaining parking time at either retail or discounted rates. As such, the PME system 100 allows for revenue sharing with the customer that is selling their remaining time to others.

In general, the PME system 100 includes an intelligent parking management system for use by municipal governments and owners of private parking lots and garages. The PME system 100 may utilize IoT technology to monitor parking spaces and can track occupancy, time expiration, and violations automatically. The companion client application 146 makes payment convenient and provides the ability to receive alerts to avoid time expiration penalties. Automated ticketing saves time for law enforcement while providing complete coverage of parking spaces to be monitored, which would be cost-prohibitive with traditional in-person parking enforcement methods.

In this disclosure, customers (i.e., user 147) may use the client application 146 to store their payment and vehicle information. The app allows for the payment for parking time from anywhere and for the receipt of notifications regarding time remaining. The client application 146 also has GPS to guide the user/customer to vacant parking spots or return to the one with the user's vehicle.

As an example, account management in the PME system 100 allows the user to enter and store personal and payment information for future convenience. Vehicle profiles allow the user to save separate profiles for each vehicle they may use on a regular basis. One of these vehicles can be designated as the default for the app to simplify daily usage.

The PME system 100 may utilize notifications that allow the client application 146 to receive confirmation from the network application 144 of the servers 102 when a parking session is engaged. The client application 146 also receives alerts to warn when time is getting close to expiring and when a violation has occurred. Remote payment allows the customer to purchase additional time through the phone without having to return to the physical parking spot. GPS integration allows the client application 146 to request the location of nearby vacant parking spots and can provide directions to the customer's vehicle when a parking session is engaged. Moreover, the client application 146 solves the many inconveniences associated with traditional parking meters, including the need to use cash or coins, the requirement of the user to track time, the tendency to forget where a car is parked, the need to interrupt activities to return to a meter in order to add more time, and the lack of a means to find out where there might be unoccupied parking spaces nearby.

The PME system 100 may also include intelligent parking systems using artificial intelligence (AI) enhanced parking signs (smart signs) to replace parking meters. These smart signs may be deployed in designated parking zones, and each smart sign may have an associated zone number. These smart systems will then allow a consumer to rent an available parking space simply by sending a text to the designated zone number. License plate numbers for consumers' vehicles may be associated with their respective mobile phone numbers. The result is an intuitive parking experience without the necessity of carrying cash or coinage.

In general, these smart sign systems are a parking meter replacement using AI technology to track the status of a designated zone of parking spaces. The signs communicate with a back-end system of the PME system 100 capable of receiving text messages and matching the customer's incoming mobile number with the license plate number for the registered vehicle. Signs carry visible zone numbers so that the customers will text their bookings to the appropriate location.

The PME system 100 tracks all available parking spaces in a designated parking zone. Customers enjoy the convenience of an easy-to-understand system that makes booking parking time quick and intuitive. Since the PME system 100 may utilize text messages, the PME system 100 can use a customer's mobile number to dispatch return messaging to the consumer based on deployment configurations. Options for high-value messages include time expiration warnings, queries for an extended time, the ability for the consumer to text time extensions, and other relevant notifications.

In general, clear signage reduces confusion regarding expected consumer actions. This method eliminates the need for staffing parking enforcement to manually check meters or collect currency. Consumers can use the fast and familiar technology of texting rather than fumbling with coins or the multi-step process of logging into an app.

In this example, a customer may park their vehicle at either a street parking spot or parking space in a parking lot. In this example, the street parking space and spaces in the parking lot have smart signs that operate as discussed earlier. The smart signs are in signal communication with a network that may be for example the Internet.

In this example, the user may have a mobile device that is connected to the network via a wireless connection and the PME system 100 may include one or more computer-based servers (i.e., servers 102) that in signal communication with the smart signs, the customer's mobile device and a police station. The servers 102 may be cloud-based servers.

In this example, the servers 102 control the smart signs that may include one or more sensors (i.e., sensor 108 and second sensor 116) and that can detect the presence of the customer's (i.e., the user 147) vehicle in the corresponding parking space (i.e., parking space 126 or 134, respectively).

The servers 102 will run software that is in communication with the client application 146 on the mobile client device 104 of the user 147.

Figure 3:
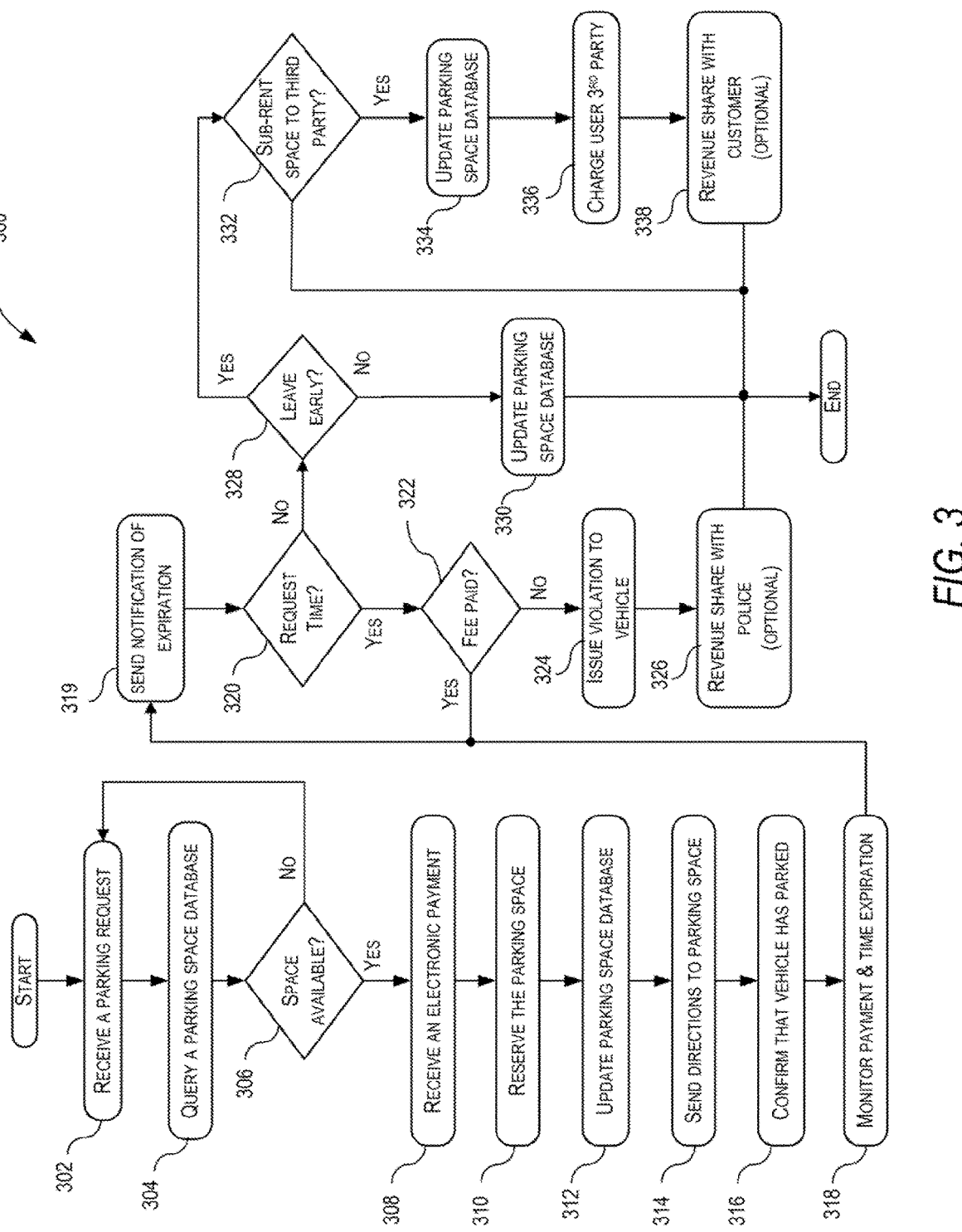
FIG. 3 is a flowchart of an example of an implementation of a method performed by the PME system in accordance with the present disclosure.

Turning to FIG. 3, a flowchart of an example of an implementation of a method 300 performed by the PME system 100 is shown in accordance with the present disclosure. The method 300 starts by the PME system 100 receiving 302 a parking request from the user 147 via the mobile client device 104. In this example, the user 147 utilizes the client application 146 may be an Internet browser displaying a webpage or mobile specific application that access the network application 144 of the servers 102. The network application 144 may require that the user 147 create an account on with the network application 144 and provide personal identification information such as, for example, a mobile telephone number, email address, social media identification, home address, home telephone number, etc. Once the account is created, the user 147 may provide information about a vehicle that the user 147 intends to park such as, for example, license plate number, model, make, and color. The servers 102 may save this information in the user database 220.

The servers 102 may then optionally provide the user 147 with available parking spaces located within a predetermined distance to the location of the user 147. The location of the user 147 may be determined by location services, such as GPS, provided by the mobile client device 104 to the servers 102. Alternatively, the user 147 may provide a different location and time for the parking request such as, for example, a parking request in another city for date and time in the future. This request may include a time duration for the reservation.

The servers 102 then determines 306 the available parking spaces by querying 304 the parking space database 222 and sends the client application 146 of the user 147 a listing of available parking spaces for the user 147 to choose from. This listing may be listed in various formats that are compatible with the client application 146 and may include, for example, a map and/or listing showing the locations of the available parking spaces. If there are no available parking spaces, the network application 144 of the servers 102 sends a notification that no parking spaces are available and the method 300 repeats by waiting for the next request 302 from the user 147.

If there are available parking spaces, the network application 144 informs the user 147 of the available parking spaces and sends a notification for electronic payment to reserve the available parking space. The payment system 150 of the servers 102 then waits from payment from the user 147. The payment system 150 may process payment information that may include a credit card, charge card, PayPal®, Google Pay®, Apple Pay®, or other electronic payment type.

In this example, the electronic payments of step 308 may have a few options. Step 308 shows that the payment for a parking spot is when the user 147 reserves the parking space. However, it is appreciated those of ordinary skill in the art that a pre-payment option is also available that allow a user to pay for the parking spot before parking the vehicle or even before querying for a parking spot. Moreover, the payment may be optionally made when the user 147 parks the vehicle within the parking spot.

Once the payment system 150 receives 308 the electronic payment from the user 147, the scheduler 224 of the servers 102 reserves 310 the parking space for the user 147 at the location, date, time, and time duration requested by the user 147. Alternatively, the servers 102 may first reserve the parking space and then wait for payment prior to the user 147 parking the registered vehicle in the reserved parking space. The method 300 then updates 312 the parking space database 222 to reflect that the parking space is no longer available because the user 147 has it reserved for the date, time, and time duration requested. The network application 144 then sends the user 147 the directions to the reserved parking space. When the time arrives, the servers 102 then confirms 316 that the vehicle of the user 147 has parked within the reserved parking space. The servers 120 then monitors 318 that payment was made, and the vehicle is parked for the time duration requested. The servers 120 determines the time expiration and sends 319 a notification of time expiration to the user 147 via the network application 144 and client application 146 so as to remind the user 147 how much time is left prior to the time expiration. This notification may be sent optionally once or multiple times prior to the time expiration at different intervals such as 15 minutes prior to the time expiration, 10 minutes prior, 5 minutes prior, etc. The servers 102 may then wait for an extension of time request from the user 147 to extend the parking duration by a certain time. If a time extension request 320 is received by the servers 102, the servers 102 will receive the request from the user 147 that includes a request additional time for the parking space and, in response, will send a request to the user 147 for an additional payment for the requested additional time. If the additional fee is paid 322, the method 300 will repeat and servers 102 will again monitor 318 the time that the vehicle is parked in the parking space and will again send a notification of expiration once the time is close to the new time expiration after the requested time extension.

If the additional fee is not paid 322, the violation monitor 266 of the servers 102 will generate a violation flag that may be optional sent to the enforcement entity 124 for the issuance of a violation citation. If the PME system 100 is a governmental entity such as, for example, a municipality parking system, the severs 102 or enforcement entity 124 (which may be a police department) may issue 324 a violation citation to the vehicle by sending the citation directly to the user 147 via the network application 144 and client application 146 utilizing the personal information provided by the user 147 in creating a user account for use with the PME system 100. If the PME system 100 is a private entity such as, for example, a private parking lot, the severs 102 or enforcement entity 124 (which may be a police department) may issue 324 a violation citation to the vehicle by sending the citation directly to the user 147 via the network application 144 and client application 146 utilizing the personal information provided by the user 147 in creating a user account for use with the PME system 100. In this situation, the PME system 100 may optionally allow for revenue sharing 326 between the private entity (i.e., the parking manager 122) and the police department (i.e., the enforcement entity 124). The method 300 then ends.

Once the use 147 leaves the parking space at the time duration, the servers 102 update the parking space database 222 to reflect the parking space is again available to reserve and rent. The method 300 then ends.

If the user 147 does not request 322 additional time but leaves 328 the parking space early (i.e., before the exhaustion of the time duration at the time expiration), the servers 102 optionally can calculate a credit for the user 147 for the unused parking space or allow the user 147 to attempt to sub-rent 332 the parking space to third-party. If the user 147 does not desire to sub-rent the parking space, the method 300 ends.

If, instead, the user 147 wants to sub-rent the parking space, the servers 102 updates the parking space database 222 and shows the parking space as available to third-parties. If a third-party reserves and pays for the parking space within the unused time of the user 147, the servers 102 will rent and charge 336 the third-party for the use of the parking space. The review generated from the third-party may be optionally revenue shared 338 with the user 147. The method 300 then ends.

Figure 4:
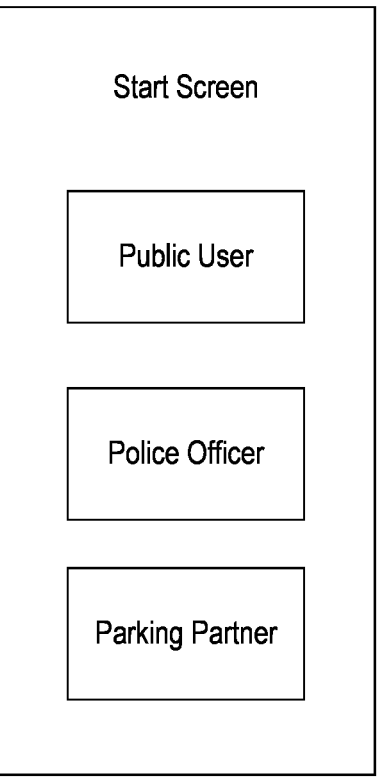
FIG. 4 is a screen interface of an example of an implementation of a mobile device application of the system for parking management and enforcement in accordance with the present disclosure.

Turning to FIG. 4, a screen interface of an example of an implementation of a mobile device application of the system for parking management and enforcement is shown in accordance with the present disclosure. In this example, the smart systems may utilize three different type of apps that include an app for consumers, another app for police departments, and another app for private garage owners/public city parking management.

Figure 5:
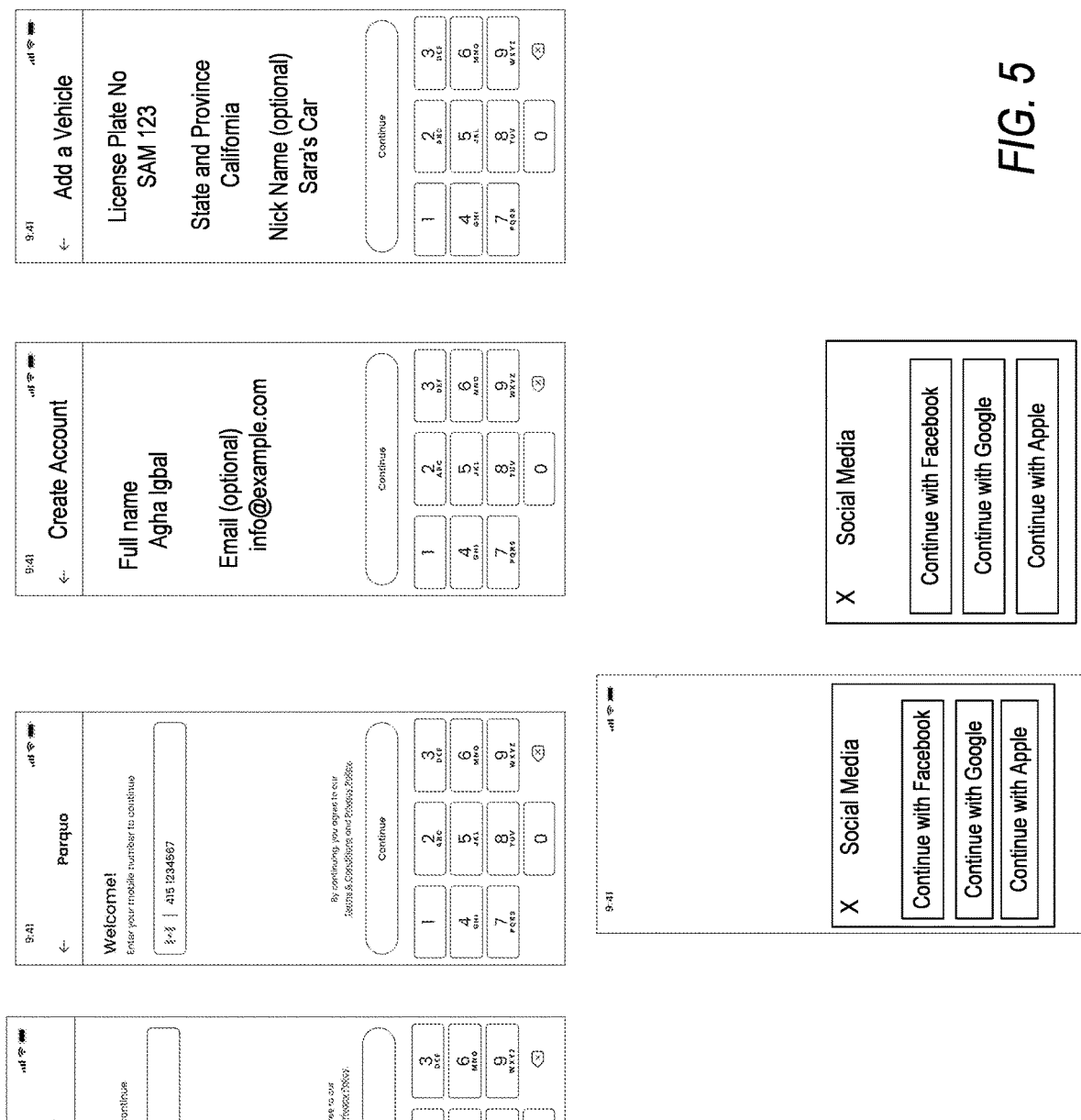
FIG. 5 includes screen interfaces of an example of an implementation of onboarding a public user into the mobile device application shown in FIG. 4 in accordance with the present disclosure.

In FIG. 5, screen interfaces are shown of an example of an implementation of onboarding a public user into the mobile device application shown in FIG. 4 in accordance with the present disclosure. In this example, each public or consumer user would be identified by the mobile number and plate number. For example, one person might have one mobile but more than one car.

Figure 6:
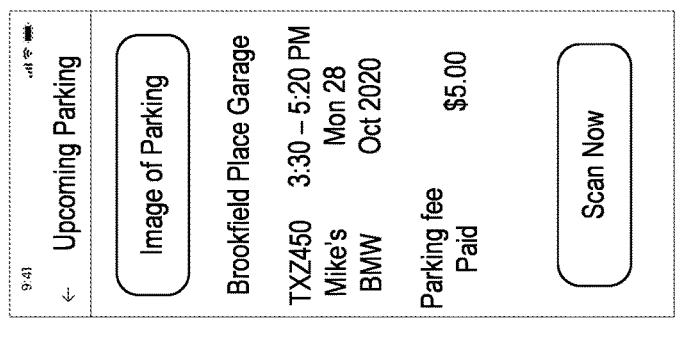
FIG. 6 includes screen interfaces of an example of an implementation of account information of the public user in accordance with the present disclosure.
Figure 6:
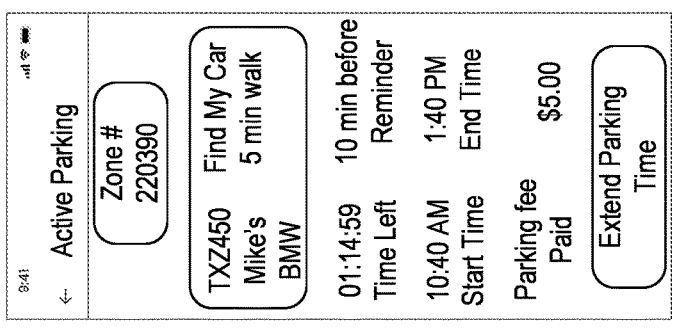
Figure 6:
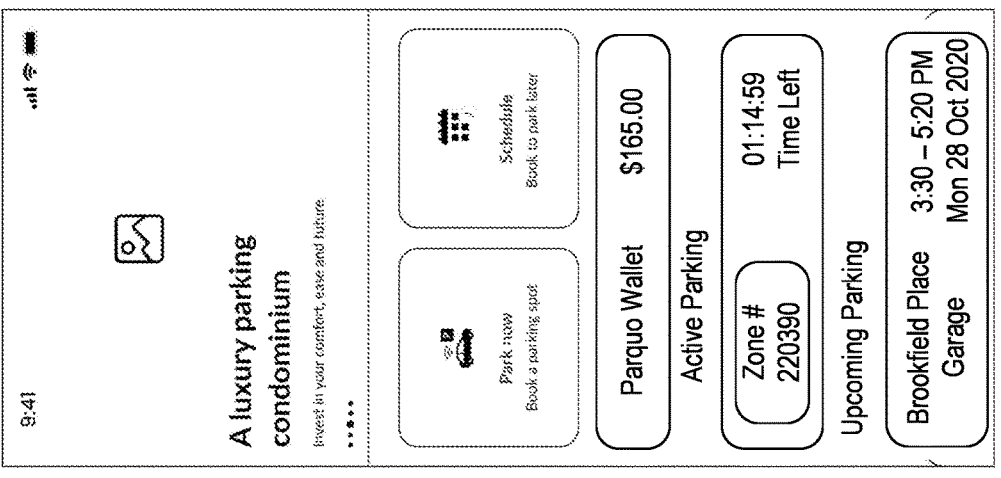
Figure 6:
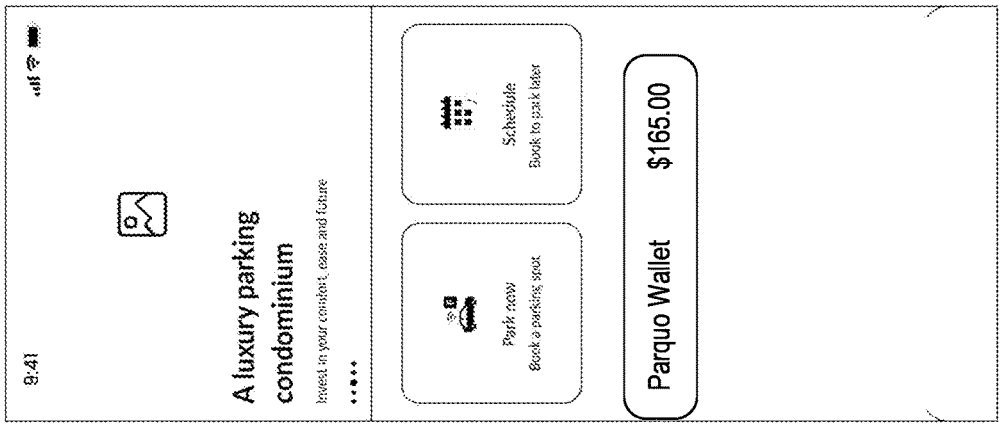

FIG. 6 includes screen interfaces of an example of an implementation of account information of the public user in accordance with the present disclosure. In this example, the user/customer will have a wallet that is associated to their mobile telephone number and vehicle license plate, and if they purchased time but leave early they can sell their spots. The balance will stay on their wallet and this may have a tokenized system. The user can pay for the parking spot in advance and they will get a reminder if the parking is expired. It may also include other features such as finding my car when people park and forget where they parked. It also shows how much they paid, when they paid, and where they paid. Moreover, the user is capable of paying for any violations using the wallet on their mobile device.

Figure 7:
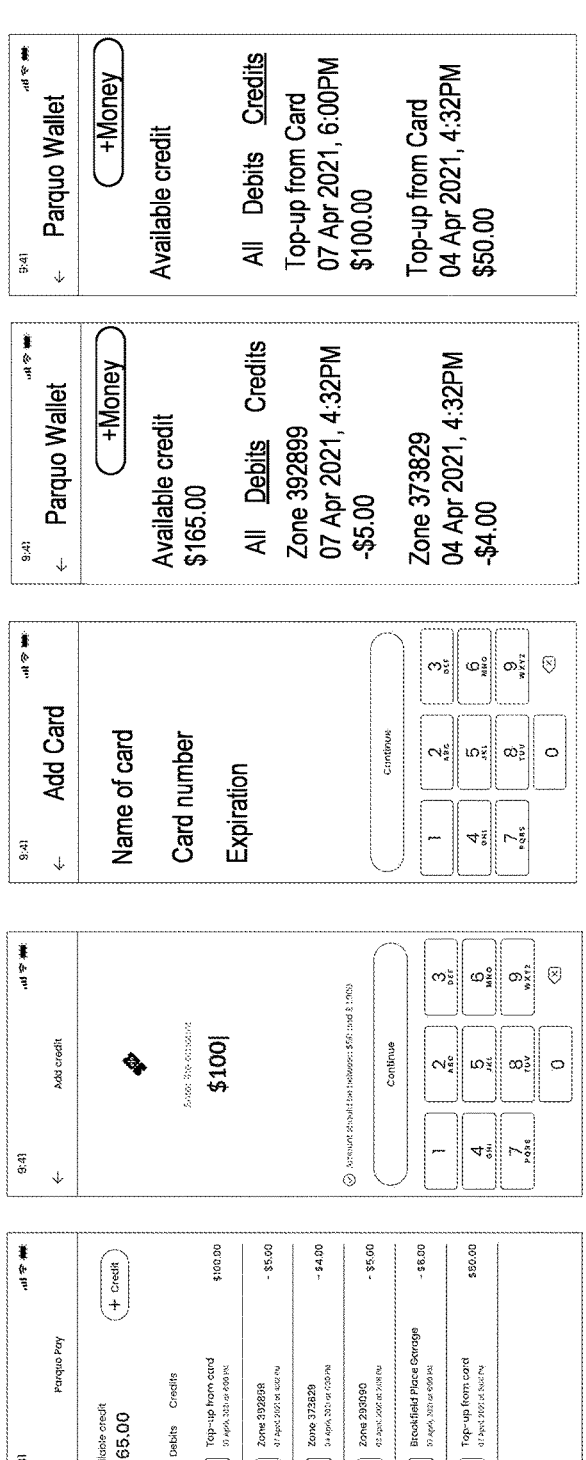
FIG. 7 includes screen interfaces of an example of an implementation of a parking wallet for the public user in accordance with the present disclosure.
Figure 7:
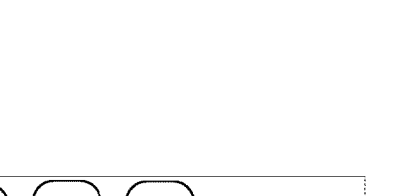

FIG. 7 includes screen interfaces of an example of an implementation of a parking wallet for the public user in accordance with the present disclosure. In this example, the user has different options to pay from Apple Pay®, Google Pay®, to Paypal®, credit card. It shows the wallet where people have accumulated money for the spots that they sold and they can redeem this money down the road.

Figure 8:
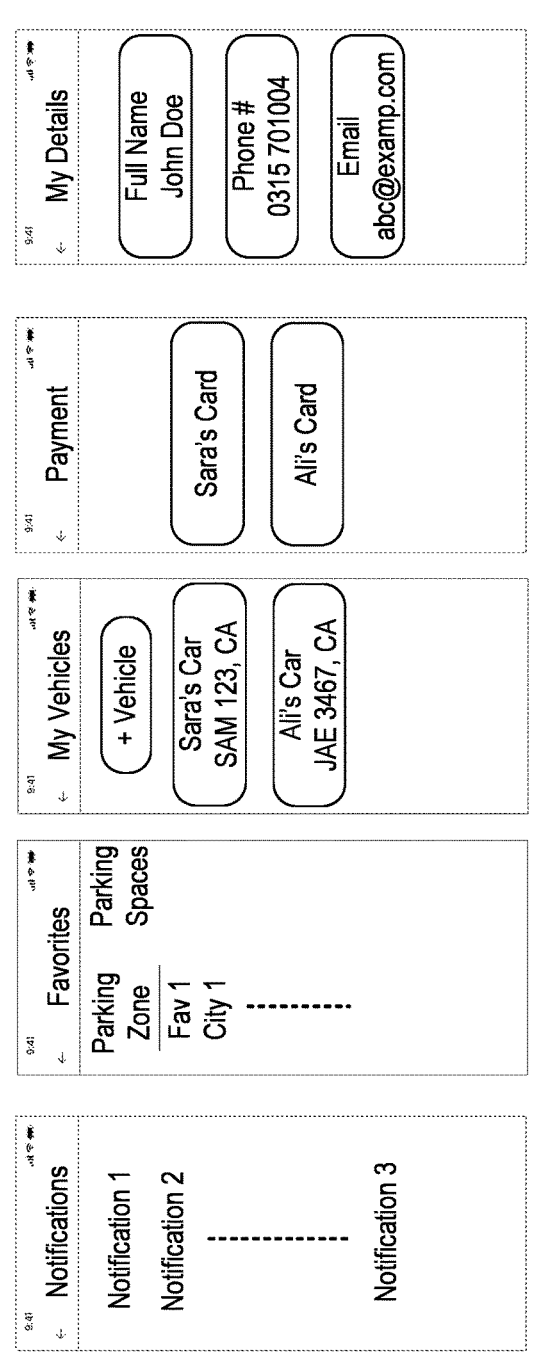
FIG. 8 includes screen interfaces of the public user's profile in accordance with the present disclosure.
Figure 8:
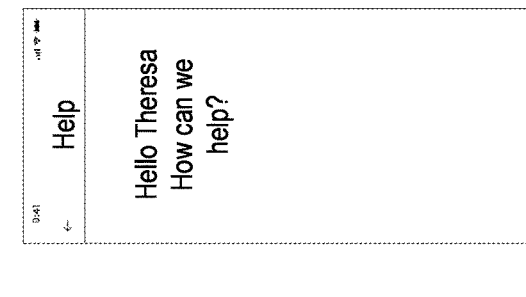
Figure 8:
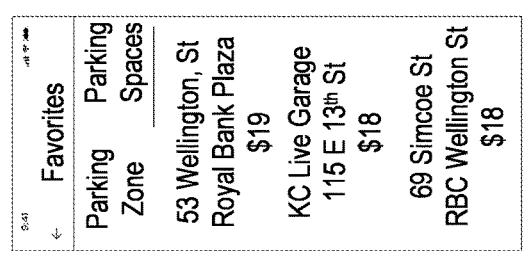
Figure 8:
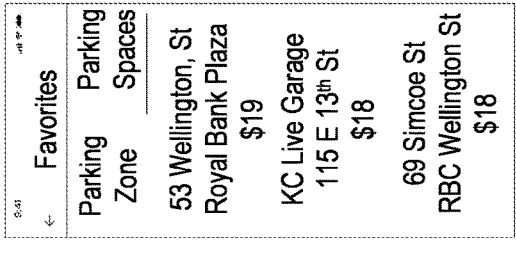

FIG. 8 includes screen interfaces of the public user's profile in accordance with the present disclosure. In this example, the user can create a profile and have more than one vehicles. The user can review the parking place and/or see the reviews by others prior to parking in the spot. This example may be integrated in FasTrack®.

Figure 9:
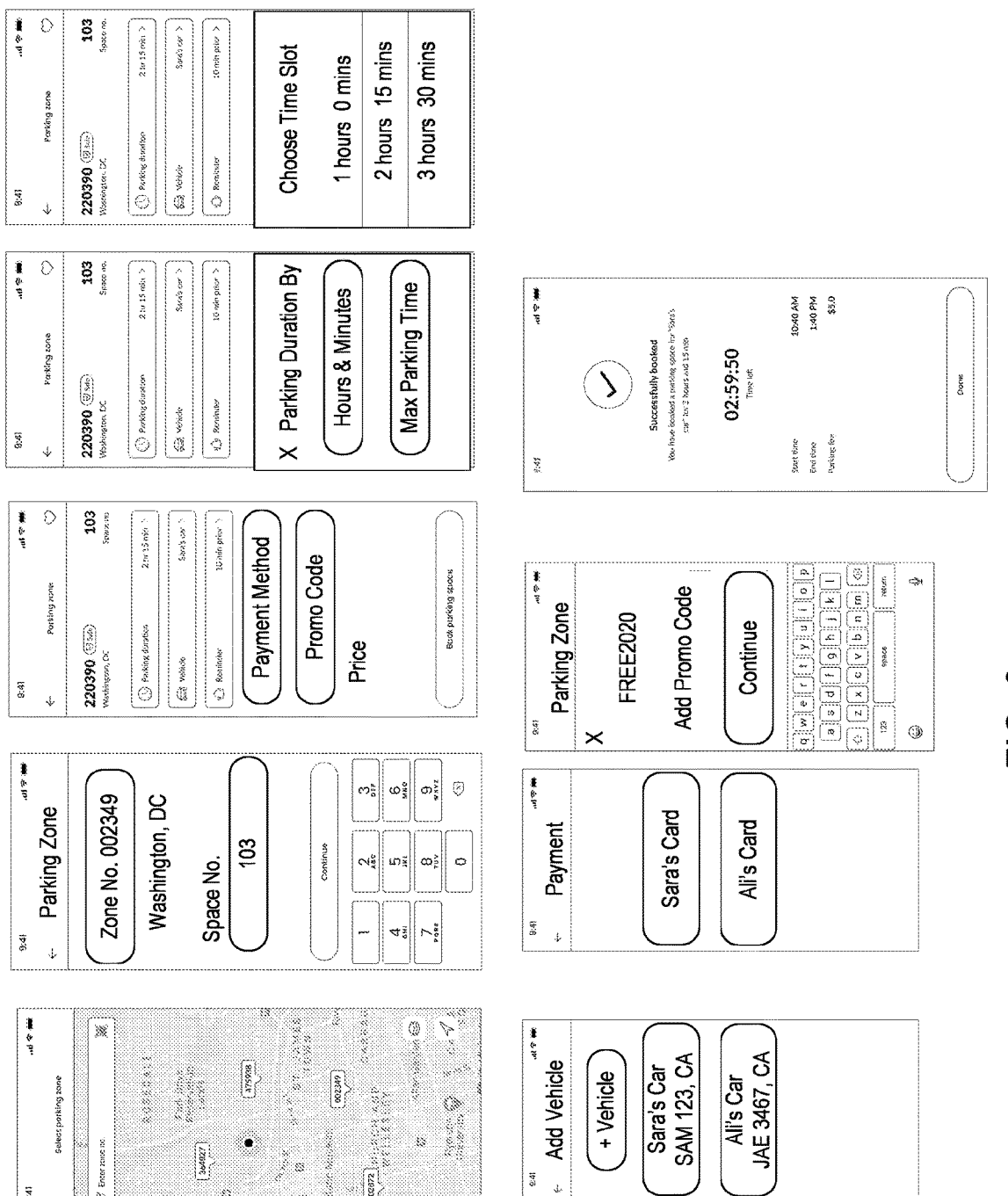
FIG. 9 includes screen interfaces of the public user's using the mobile application to book a parking space now with location of the public user's vehicle enabled in accordance with the present disclosure.

FIG. 9 includes screen interfaces of the public user's using the mobile application to book a parking space now with location of the public user's vehicle enabled in accordance with the present disclosure. In this example, each smart city may be divided into zones and users may pay based on the zone numbers as can been seen in the screen shots. Utilizing this system, the parking meters of existing parking system may be removed and new smart signs may be used instead.

Figure 10:
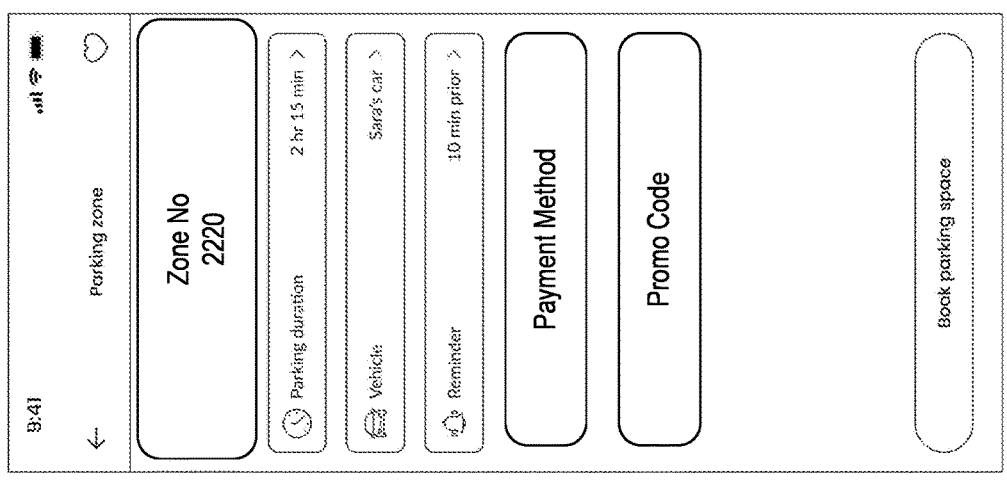
FIG. 10 includes screen interfaces of the public user's using the mobile application to book a parking space now with location of the public user's vehicle disabled in accordance with the present disclosure.
Figure 10:
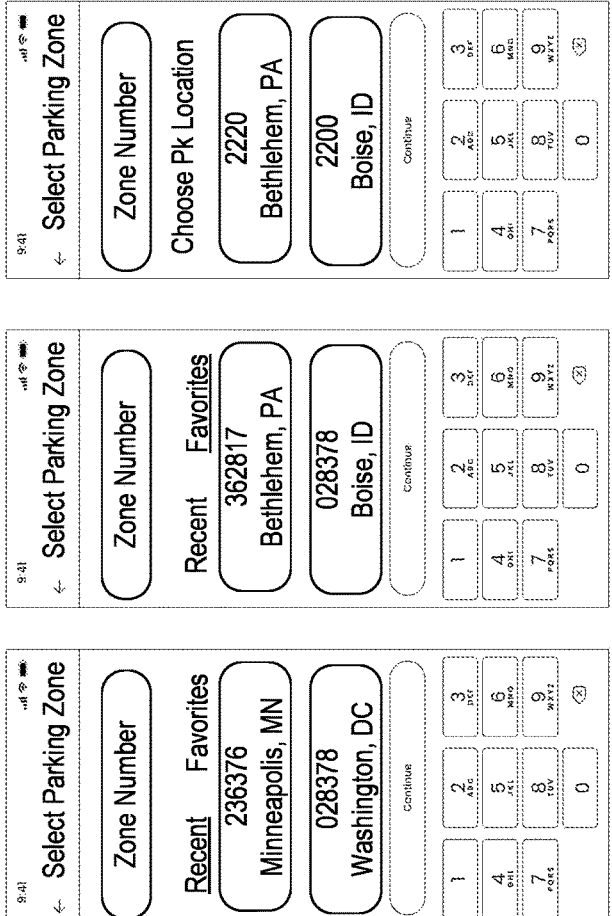

FIG. 10 includes screen interfaces of the public user's using the mobile application to book a parking space now with location of the public user's vehicle disabled in accordance with the present disclosure. In this example, the app is location based and users can enable the location of the vehicles to find favorite zones or close zones.

Figure 11:
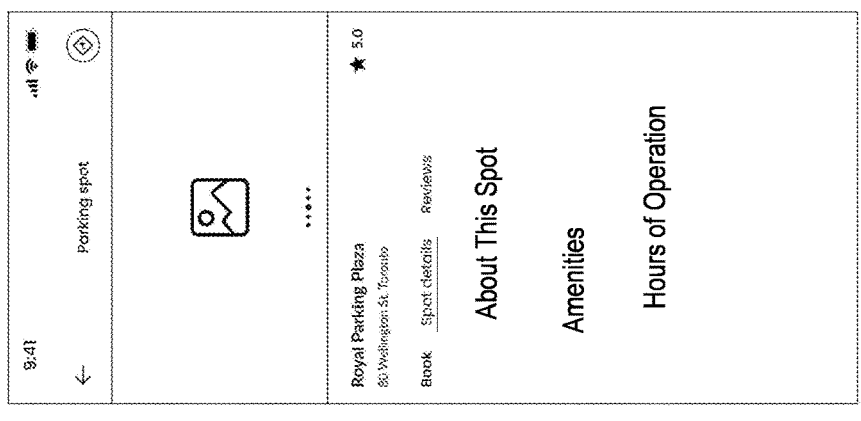
FIG. 11 includes screen interfaces of the public user's using the mobile application to reserve a parking space for later with location of the public user's vehicle enabled in accordance with the present disclosure.
Figure 11:
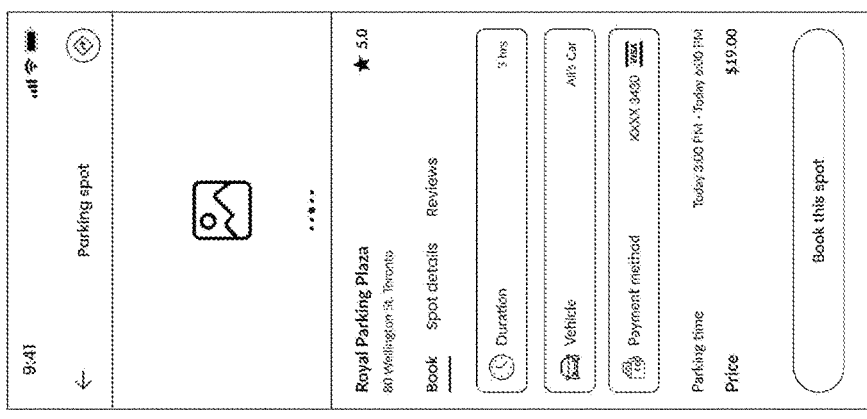
Figure 11:
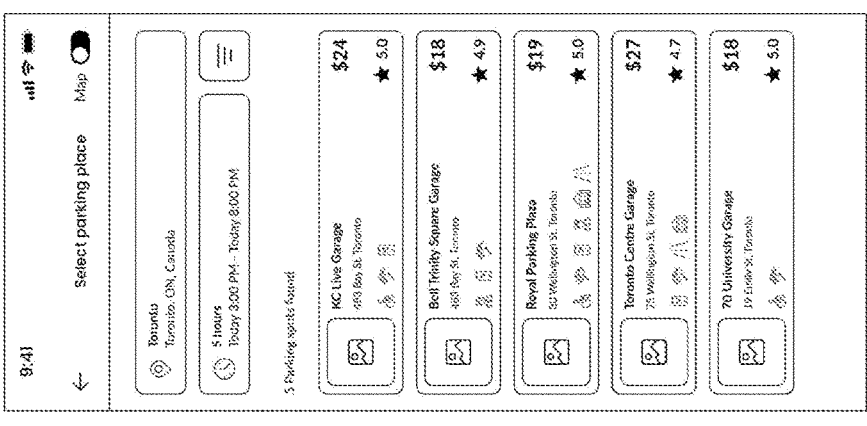
Figure 11:
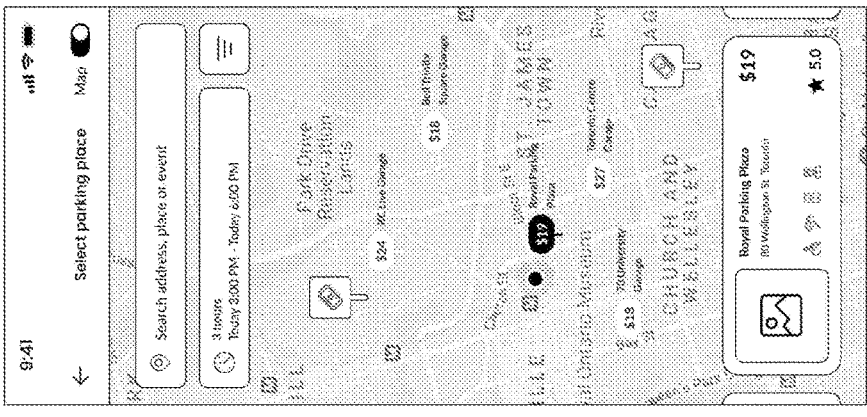

FIG. 11 includes screen interfaces of the public user's using the mobile application to reserve a parking space for later with location of the public user's vehicle enabled in accordance with the present disclosure. In this example, the app shows the available parking spots, time the spot is available, location, pricing, review, FAQ, etc.

Figure 12:
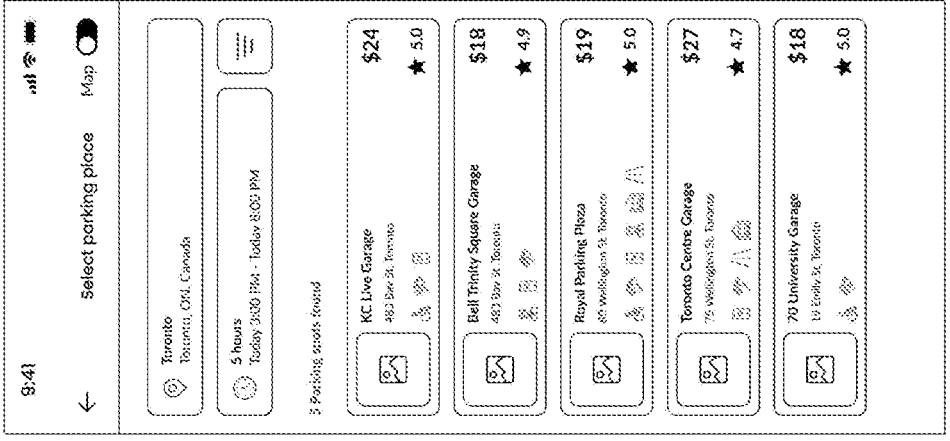
FIG. 12 includes screen interfaces of the public user's using the mobile application to reserve a parking space for later with location of the public user's vehicle disabled in accordance with the present disclosure.
Figure 12:
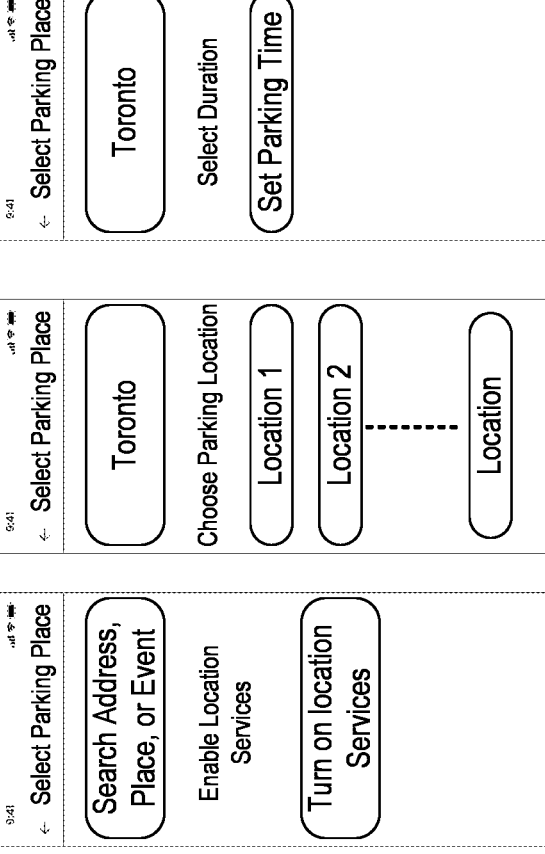

FIG. 12 includes screen interfaces of the public user's using the mobile application to reserve a parking space for later with location of the public user's vehicle disabled in accordance with the present disclosure. In this example, the user can pick the available spots, duration, location, etc.

Figure 13:
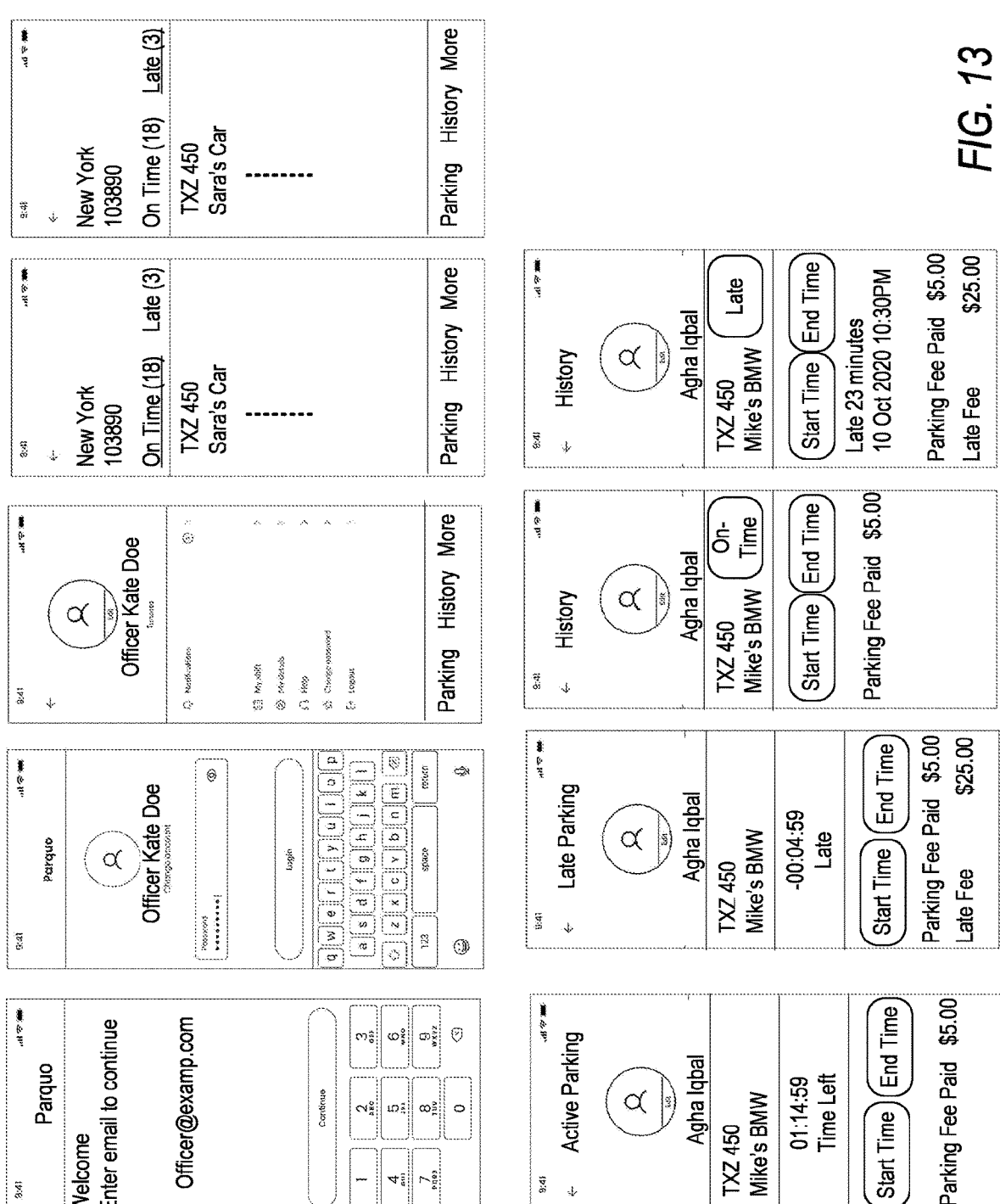
FIG. 13 includes screen interfaces of an example of an implementation of a police officer using the mobile application to monitor the parking space in accordance with the present disclosure.

FIG. 13 includes screen interfaces of an example of an implementation of a police officer using the mobile application to monitor the parking space in accordance with the present disclosure. In this example, the user can extend and buy more time if needed. In this example, there is a grace period of 5 minutes shown and if they don't renew in time, they get the ticket (i.e., the violation).

Figure 14:
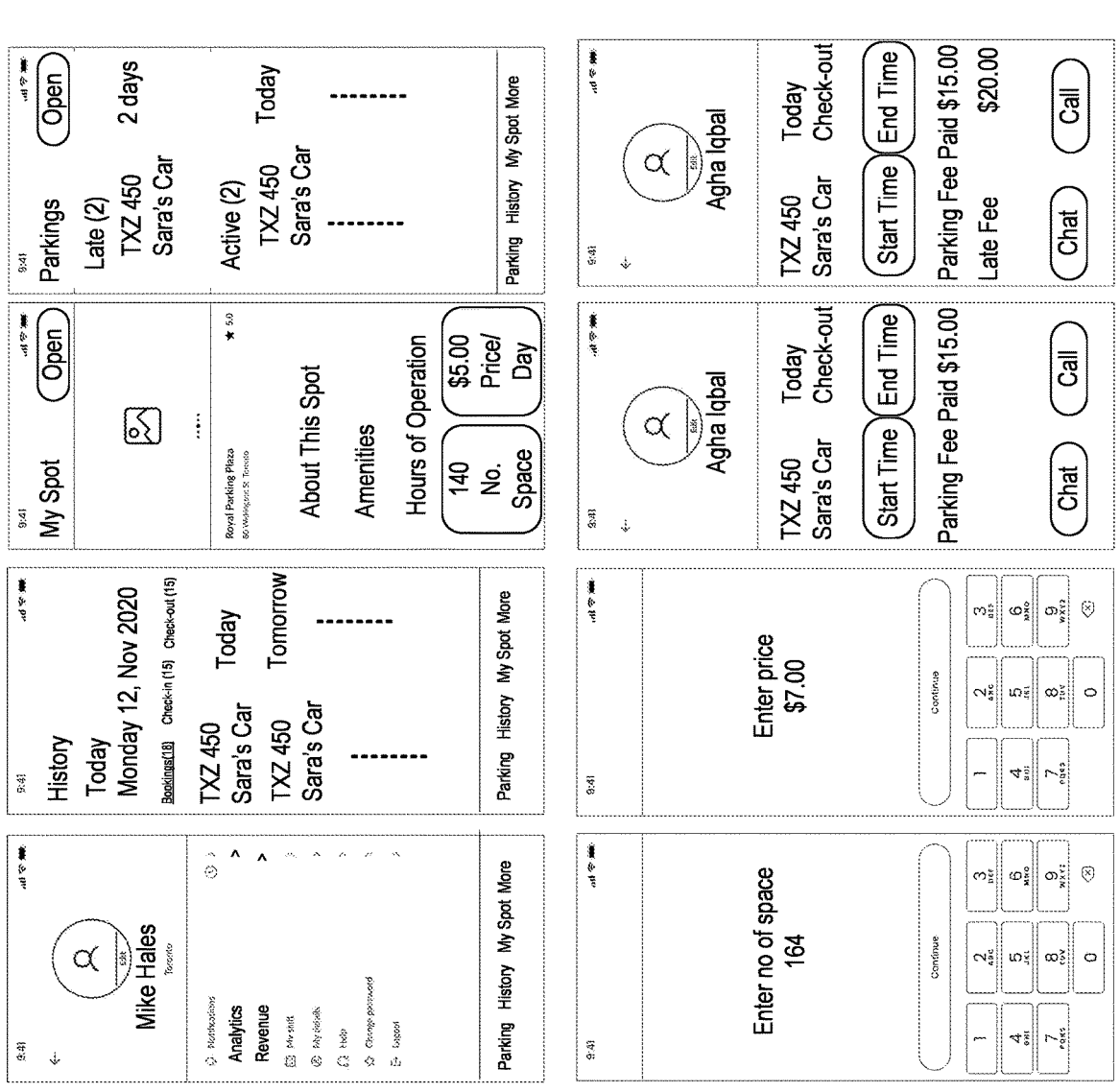
FIG. 14 includes screen interfaces of an example of an implementation of a parking partner's personnel using the mobile application to monitor the parking space in accordance with the present disclosure.

FIG. 14 includes screen interfaces of an example of an implementation of a parking partner's personnel using the mobile application to monitor the parking space in accordance with the present disclosure. In this example, this is the app for the police that basically cuts the need for officers to go to the vehicles to issue tickets. The app has a report that shows the vehicles, plate number, timing, location, violation, payment that will be sent via a text message and collection. In this example, the revenue share then will be between the app and police department.

Figure 15A:
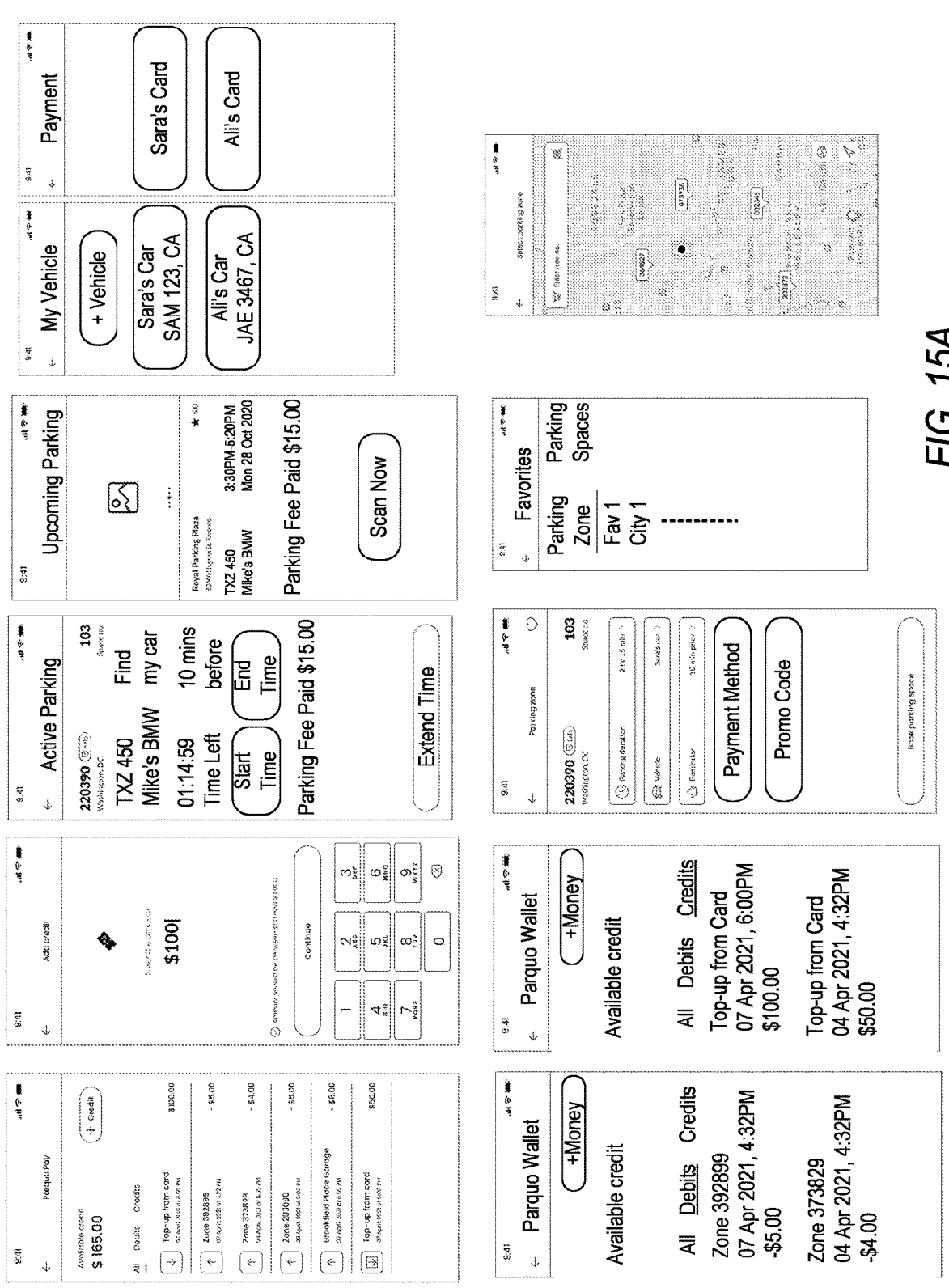
FIGS. 15A and 15B includes screen interfaces of an example of an implementation of the mobile application to monitor the parking space in accordance with the present disclosure.
Figure 15B:
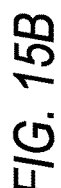
Figure 15B:
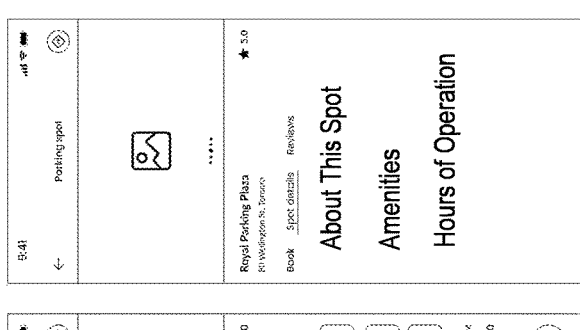
Figure 15B:
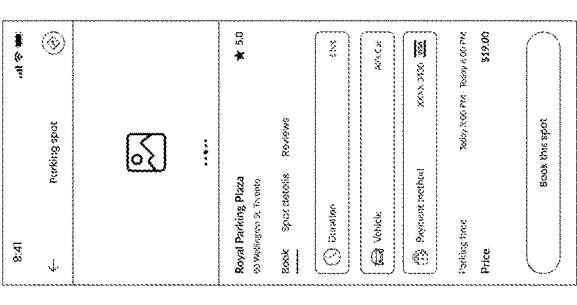
Figure 15B:
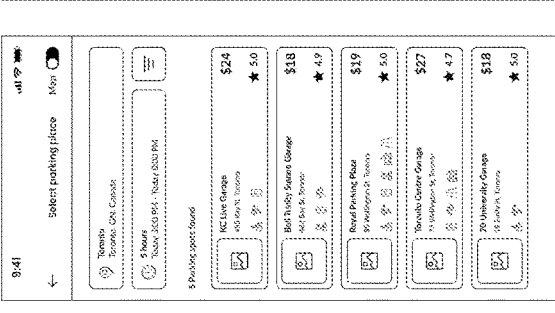
Figure 15B:
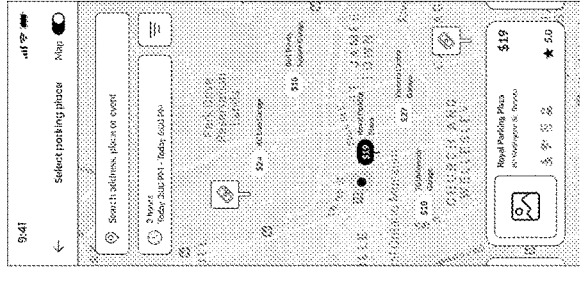
Figure 15B:
Figure 15B:
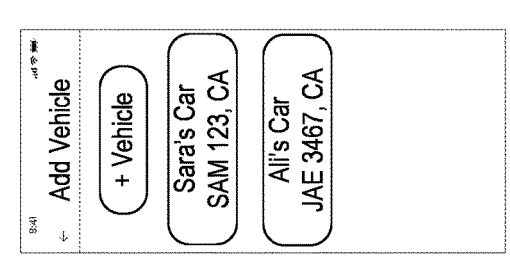
Figure 15B:
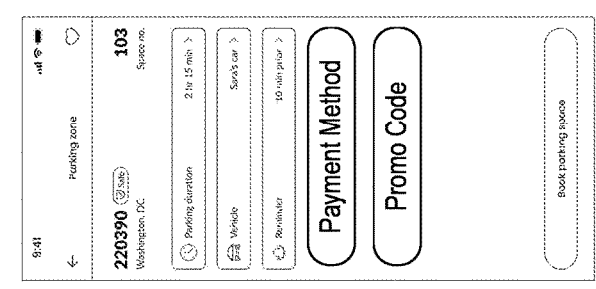
Figure 17L:
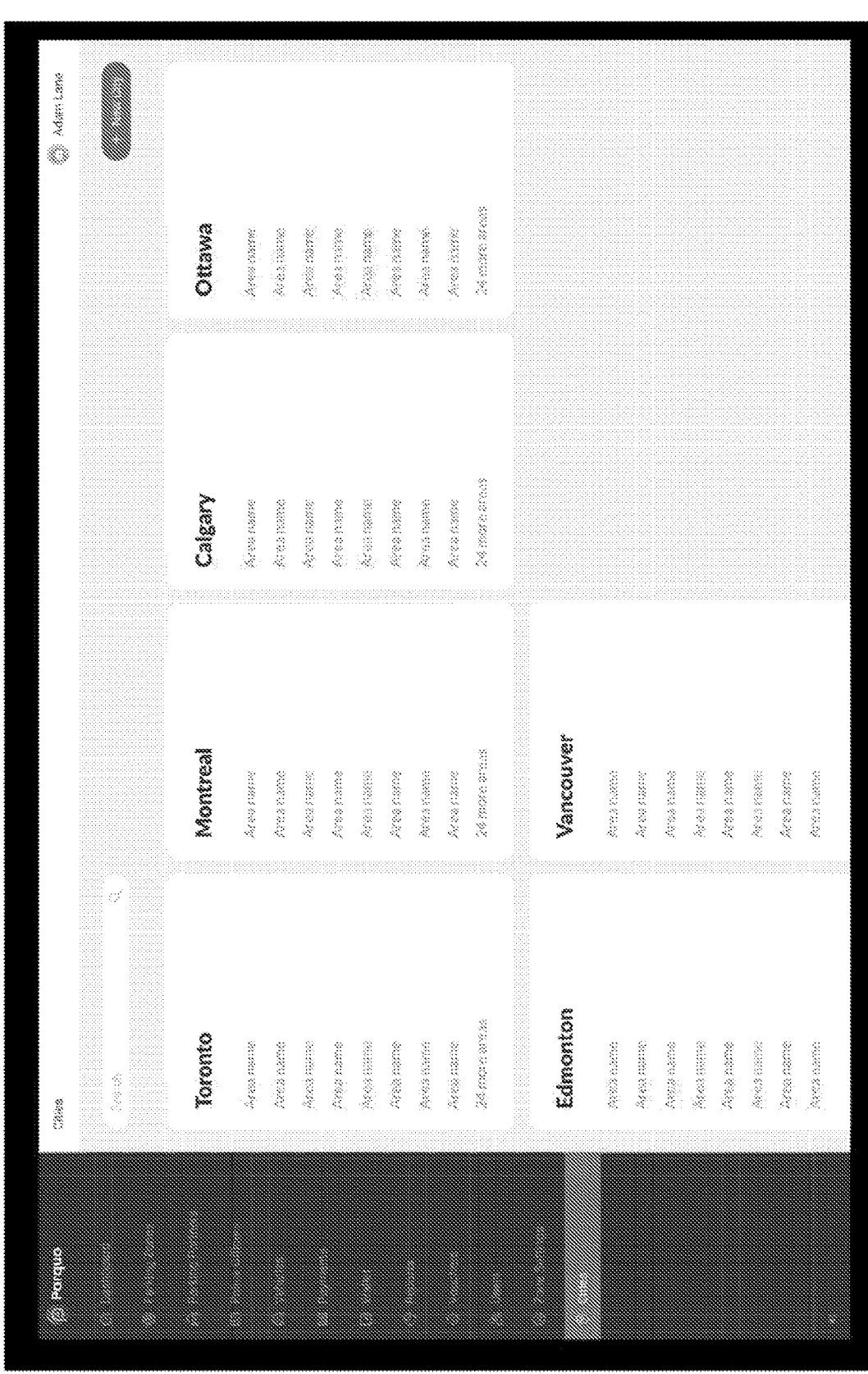

FIGS. 15A and 15B includes screen interfaces of an example of an implementation of the mobile application to monitor the parking space in accordance with the present disclosure.

In this example, the app is operating as a private owner garage profile and the app shows the info about their property, analytics, revenue, empty spots, rush hours, etc. This app allows the owner to change the pricing such as if they need to increase prices for the events and/or provide lower or higher prices for certain promotions. In this example, the app also allows for the restaurants, events, and other entities to advertise information to the user via the app and mobile device.

In FIG. 16, a front view of an example of an implementation of a smart sign is shown in accordance with the present disclosure. By utilizing smart signs similar to this one, municipalities may remove their older parking meters that are expensive equipment that needs to be maintenance with smart signs. In this example, the smart sign may include the previously described sensor (e.g., 108 and 116) that are configured to sense if there is a vehicle in the associated parking space. It may also include an output device such as, for example, a light source that may change color based on whether the sensor detects the presence of a vehicle in the parking space, whether the vehicle is the correct vehicle (e.g., by scanning the license plate with a image sensor to see if the license plate number corresponds to the reserved vehicle), whether the vehicle still has paid time for the parking, or whether the time has expired.

FIGS. 17A-17L are screen shots of an example of an implementation of a dashboard graphical user interface (GUI) for use with the system for PME System 100 in accordance with the present disclosure. In these example, the dashboard may provide reporting information to the parking manager 122 about the status of the parking spaces in the PME System 100. This information may allow the parking manager 122 to control and potentially change parking prices based on discounts, availability, time of the day, time of the week, specials, or other factors to maximize potential generated review from the parking spaces.

As a summary, the disclosure is described by the following clauses.

Clause A. A parking management and enforcement (PME) system for managing parking at a plurality of parking spaces, the PME system comprising: a controller, wherein the controller is in signal communication with a sensor located proximate to a parking space of the plurality of parking spaces, and the sensor is configured to determine the presence of a vehicle in the parking space; and a server in signal communication with the controller, wherein the server comprises a computer-readable medium having executable instructions; and a processor, in signal communication with the communications interface and the computer-readable medium, the processor configured to perform operations based on the executable instructions that include: receiving a parking request from a user via a mobile client device; determining an available parking space for the user using a parking space database; receiving electronic payment for the available parking space from the user; and reserving the available parking space for the user with a scheduler.

Clause B. The PME system of clause A, wherein the controller is in signal communication with an output device located proximate to the parking space, and the output device is configured to transmit information related to the parking space.

Clause C. The PME system of clause A, wherein receiving a parking request includes receiving a requested location for a requested parking space and a requested time to reserve the requested parking space from the user utilizing a client application on the mobile client device.

Clause D. The PME system of clause C, wherein determining an available parking space for the user includes querying the parking space database for parking spaces at the requested location and at the requested time to determine the available parking space.

Clause E. The PME system of clause D, wherein determining an available parking space further includes utilizing the sensor, via the controller, to confirm that the available parking space is empty and available for the user.

Clause F. The PME system of clause A, further including sending location information to the user via the mobile client device for the reserved available parking space.

Clause G. The PME system of clause A, further including updating the parking space database with the reserved available parking space allocated to the user at a requested time received from the user.

Clause H. The PME system of clause G, further including confirming that a vehicle from the user has parked at the reserved available parking space at the requested time, and notifying the user of a time expiration for the reserved available parking space, wherein the requested time received from the user includes a requested parking time for the user to utilize the reserved available parking space and the notification of the time expiration is sent to the user via the mobile client device.

Clause I. The PME system of clause H, wherein notifying the user of the time expiration includes sending a request to the user, via the mobile client device, for a second electronic payment to extend the time expiration, and receiving electronic payment includes receiving the second electronic payment to extend the time expiration.

Clause J. The PME system of clause H, further including sending location information to the user via the mobile client device for the reserved available parking space.

Clause K. The PME system of clause A, further including monitoring electronic payment and time expiration.

Clause L. The PME system of clause K, further including updating the parking space database with the reserved available parking space allocated to the user at a requested time received from the user, confirming that a vehicle from the user has parked at the reserved available parking space at the requested time, notifying the user of a time expiration for the reserved available parking space, and sending a violation to the user via the mobile client device if the vehicle is still parked in the reserved available parking space after the time expiration, wherein the requested time received from the user includes a requested parking time for the user to utilize the reserved available parking space and the notification of the time expiration is sent to the user via the mobile client device.

Clause M. The PME system of clause L, wherein sending a violation to the user includes transmitting a violation flag that is sent to the enforcement entity that generates a violation citation, and sending the violation citation to the user via the mobile client device.

Clause N. The PME system of clause A, further includes updating the parking space database with the reserved available parking space allocated to the user at a requested time received from the user, confirming that a vehicle from the user has parked at the reserved available parking space at the requested time, determining a time expiration for the reserved available parking space based on the requested time received from the user that includes a requested parking time for the user to utilize the reserved available parking space, determining if the vehicle leaves the reserved available parking space at an exit time prior to the time expiration, and calculating a monetary credit amount for the user from the received electronic payment for the available parking space, the exit time, and the time expiration.

Clause O. The PME system of clause N, further including storing identifying information for the user, identifying information for the vehicle of the user, electronic payment information for the user, and the monetary credit amount for the user.

Clause P. The PME system of clause A, further includes updating the parking space database with the reserved available parking space allocated to the user at a requested time received from the user, confirming that a vehicle from the user has parked at the reserved available parking space at the requested time, determining a time expiration for the reserved available parking space based on the requested time received from the user that includes a requested parking time for the user to utilize the reserved available parking space, receiving a request from the user to exit the prior to the time expiration and offer a remaining time for the reserved available parking space for resell to third-parties, wherein the remaining time is equal to the time expiration time less than the exit time requested by the user, updating the parking space database with the reserved available parking space allocated to the user at the exit time, determining if the vehicle leaves the reserved available parking space at the exit time, and determining if a third-party has requested and electronically paid for the reserved parking space at the exit time, updating the parking space database with the reserved available parking space allocated to the third-party, and calculating a monetary credit amount for the user from an electronic payment for the available parking space by the third-party, the exit time, and the time expiration.

Clause Q. The PME system of clause P, further including storing identifying information for the third-party, identifying information for a vehicle of the third-party, electronic payment information for the third-party, and the monetary credit amount for the third-party.

Clause R. The PME system of clause A, wherein the controller is in signal communication with an output device located proximate to the parking space, the output device is configured to transmit information related to the parking space, and the sensor and output device are configured into a smart sign at the parking space.

Clause S. A parking management and enforcement (PME) system for managing parking at a plurality of parking spaces, the PME system comprising: a controller, wherein the controller is in signal communication with a sensor located proximate to a parking space of the plurality of parking spaces, and the sensor is configured to determine the presence of a vehicle in the parking space; and a server in signal communication with the controller, wherein the server includes a network application configured to receive parking requests from a user via a mobile client device, a parking space database on a storage device on the server, wherein the parking space database includes information about the plurality of parking spaces, a scheduler configured to determine an available parking space for the user based on the parking space database and the sensor via the controller, and a payment system configured to receive electronic payment for the parking space from the user, wherein the scheduler is configured to reserve the available parking space for the user.

Clause T. A method for managing and enforcing a plurality of parking spaces, the method comprising: receiving at a server a parking request from a user via a mobile client device; determining with the server an available parking space for the user using a parking space database; receiving electronic payment for the available parking space from the user; and reserving the available parking space for the user with the server with a scheduler.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure. Moreover, although the techniques have been described in language specific to structural features and/or methodological acts, it is to be understood that the appended claims are not necessarily limited to the features or acts described. Rather, the features and acts are described as an example implementations of such techniques.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Furthermore, the description of the different examples of implementations has been presented for purposes of illustration and description, and is not intended to be exhaustive or limited to the examples in the form disclosed. Many modifications and variations will be apparent to those of ordinary skill in the art. Further, different examples of implementations may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

It will also be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

The description of the different examples of implementations has been presented for purposes of illustration and description, and is not intended to be exhaustive or limited to the examples in the form disclosed. Many modifications and variations will be apparent to those of ordinary skill in the art. Further, different examples of implementations may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

What is claimed is:

1. A parking management and enforcement (PME) system for managing parking at a plurality of parking spaces, the PME system comprising:

a controller, wherein the controller is in signal communication with a sensor located proximate to a parking space of the plurality of parking spaces, and the sensor is configured to determine the presence of a vehicle in the parking space; and a server in signal communication with the controller, wherein the server comprises a computer-readable medium having executable instructions; and a processor, in signal communication with the communications interface and the computer-readable medium, the processor configured to perform operations based on the executable instructions that include:

receiving a parking request from a user via a mobile client device;

determining an available parking space for the user using a parking space database;

receiving electronic payment for the available parking space from the user; and reserving the available parking space for the user with a scheduler;

updating the parking space database with the reserved available parking space allocated to the user at a requested time received from the user, confirming that a vehicle from the user has parked at the reserved available parking space at the requested time, determining a time expiration for the reserved available parking space based on the requested time received from the user that includes a requested parking time for the user to utilize the reserved available parking space, receiving a request from the user to exit prior to the time expiration and offer a remaining time for the reserved available parking space for resell to third-parties, wherein the remaining time is equal to the time expiration time less than the exit time requested by the user, updating the parking space database with the reserved available parking space allocated to the user at the exit time, determining if the vehicle leaves the reserved available parking space at the exit time, determining if a third-party has requested and electronically paid for the reserved parking space at the exit time, updating the parking space database with the reserved available parking space allocated to the third-party, and calculating a monetary credit amount for the user from an electronic payment for the available parking space by the third-party, the exit time, and the time expiration.

2. The PME system of claim 1, further including storing identifying information for the third-party, identifying information for a vehicle of the third-party, electronic payment information for the third-party, and the monetary credit amount for the third-party.

* * * * *